US012689119B2

(12) United States Patent

Sone et al.

(10) Patent No.: US 12,689,119 B2
(45) Date of Patent: Jul. 21, 2026

(54) ANTENNA

(71) Applicant: YOKOWO CO., LTD., Tokyo (JP)

(72) Inventors: Takayuki Sone, Tomioka (JP); Bunpei Hara, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 276 days.

(21) Appl. No.: 18/037,082

(22) PCT Filed: Nov. 15, 2021

(86) PCT No.: PCT/JP2021/041888
§ 371 (c)(1),
(2) Date: May 16, 2023

(87) PCT Pub. No.: WO2022/102771
PCT Pub. Date: May 19, 2022

(65) Prior Publication Data

US 2024/0021997 A1 Jan. 18, 2024

Related U.S. Application Data

(60) Provisional application No. 63/135,320, filed on Jan. 8, 2021, provisional application No. 63/114,156, filed on Nov. 16, 2020.

(51) Int. Cl.
*H01Q 1/52* (2006.01)
*H01Q 1/32* (2006.01)
(Continued)

(52) U.S. Cl.
CPC ........... *H01Q 1/521* (2013.01); *H01Q 1/3275* (2013.01); *H01Q 5/321* (2015.01); *H01Q 5/40* (2015.01);
(Continued)

(58) Field of Classification Search
CPC ...... H01Q 1/362; H01Q 1/3275; H01Q 1/521; H01Q 5/321; H01Q 5/40; H01Q 9/0435; H01Q 9/36
See application file for complete search history.

(56) References Cited

U.S. PATENT DOCUMENTS

2007/0268196 A1* 11/2007 Steghafner ............ H01Q 1/521 343/893
2010/0265147 A1 10/2010 Wakui et al.
(Continued)

FOREIGN PATENT DOCUMENTS

EP 3133695 A1 2/2017
JP H10242703 A 9/1998
(Continued)

OTHER PUBLICATIONS

Extended European search report issued on Aug. 30, 2024, in corresponding European patent Application No. 21892018.9, 8 pages.
(Continued)

*Primary Examiner* — Dimary S Lopez Cruz
*Assistant Examiner* — Amal Patel
(74) *Attorney, Agent, or Firm* — XSENSUS LLP

(57) ABSTRACT

An antenna comprising: a first element including a plurality of parallel resonators configured to resonate in a first frequency band, and at least one first connecting portion configured to connect the parallel resonators immediately adjacent to each other in the plurality of the parallel resonators; and a second element configured to be connected to the first element, wherein the first element and the second element operate with radio waves in a second frequency band different from the first frequency band.

19 Claims, 28 Drawing Sheets

(51) Int. Cl.

| | |
|---|---|
| ***H01Q 1/36*** | (2006.01) |
| ***H01Q 5/321*** | (2015.01) |
| ***H01Q 5/40*** | (2015.01) |
| ***H01Q 9/04*** | (2006.01) |
| ***H01Q 9/36*** | (2006.01) |

(52) U.S. Cl.
CPC ........... *H01Q 1/362* (2013.01); *H01Q 9/0435* (2013.01); *H01Q 9/36* (2013.01)

(56) References Cited

U.S. PATENT DOCUMENTS

| | | | | |
|---|---|---|---|---|
| 2012/0326935 | A1* | 12/2012 | Kang | H01Q 9/36 343/713 |
| 2014/0159964 | A1 | 6/2014 | Kaneko | |
| 2017/0054214 | A1* | 2/2017 | Sanders | H01Q 9/0442 |
| 2019/0280372 | A1 | 9/2019 | Terashita et al. | |
| 2021/0075095 | A1 | 3/2021 | Terashita et al. | |
| 2021/0135363 | A1* | 5/2021 | Sone | H01Q 9/0407 |
| 2021/0135366 | A1 | 5/2021 | Sampo | |

FOREIGN PATENT DOCUMENTS

| | | | | |
|---|---|---|---|---|
| JP | 2010-021856 | A | 1/2010 | |
| WO | 2012/127903 | A1 | 9/2012 | |
| WO | 2018/164018 | A1 | 9/2018 | |
| WO | WO-2018159668 | A1 * | 9/2018 | H01Q 9/0407 |
| WO | 2019/124518 | A1 | 6/2019 | |

OTHER PUBLICATIONS

International Search Report and Written Opinion mailed on Feb. 1, 2022, received for PCT Application PCT/JP2021/041888, filed on Nov. 15, 2021, 9 pages including English Translation.

International Search Report and Written Opinion issued Feb. 1, 2022, in PCT/JP2021/041888, 13pp.

Office Action issued on Mar. 25, 2025, in corresponding Japanese patent Application No. 2022-562219, 2 pages.

Office Action issued on Mar. 25, 2025, in corresponding Japanese patent Application No. 2022-562221, 2 pages.

S. Maci et al., "Dual-Frequency Patch Antennas", IEEE Antennas and Propagation Magazine, vol. 39, No. 6, Dec. 1997, pp. 13-20, total 9 pages.

US Office Action issued May 8, 2025, in the related U.S. Appl. No. 18/037,080, 67pp.

Offie Action issued Jun. 2, 2026, in Application No. JP2025-139763, 2pp.

* cited by examiner

ANTENNA

CROSS-REFERENCE TO RELATED APPLICATIONS

The present application is based on PCT filing PCT/JP2021/041888, filed Nov. 15, 2021, which claims priority to U.S. Provisional Patent Application No. 63/114,156, filed Nov. 16, 2020, and U.S. Provisional Patent Application No. 63/135,320, filed Jan. 8, 2021, the entire contents of each are incorporated herein by reference.

TECHNICAL FIELD

The present disclosure relates to an antenna.

BACKGROUND ART

PTL 1 discloses an AM/FM antenna in which part of an element is located near a patch antenna.

CITATION LIST

Patent Literature

[PTL 1] Japanese Patent Application Publication No. 2010-21856

SUMMARY OF INVENTION

Technical Problem

In PTL 1, the characteristics of the patch antenna may be greatly influenced depending on the configuration of the element of the AM/FM antenna.

An example of objects of the present disclosure is to suppress influence on characteristics of another antenna. Other objects of the present disclosure will be clarified from the description in the present specification.

Solution to Problem

An aspect of the present disclosure is an antenna comprising: a first element including a plurality of parallel resonators configured to resonate in a first frequency band, and first connecting portions each configured to connect the parallel resonators immediately adjacent to each other in the plurality of the parallel resonators; and a second element configured to be connected to the first element, wherein the first element and the second element operate with radio waves in a second frequency band different from the first frequency band.

Advantageous Effects of Invention

According to an aspect of the present disclosure, it is possible to suppress influence on characteristics of another antenna.

BRIEF DESCRIPTION OF DRAWINGS

FIG. 3A is an overall explanatory diagram of a parallel resonator 20; and FIG. 3B is a diagram illustrating a circuit diagram of a parallel resonator 20.

FIG. 5A is a side view of an antenna device 1; and FIG. 5B is a plan view of an antenna device 1.

FIG. 6A is a perspective view of a parallel resonator 20; and FIG. 6B is an exploded perspective view of a parallel resonator 20.

FIG. 8A is a perspective view of parallel resonators 20 and 30 immediately adjacent to each other; FIG. 8B is a side view of parallel resonators 20 and 30 immediately adjacent to each other; and FIG. 8C is an exploded perspective view obtained by separating parallel resonators 20 and 30 immediately adjacent to each other.

FIG. 9A is a side view of an antenna device 1X; and FIG. 9B is a plan view of an antenna device 1X.

FIG. 11A is an explanatory view illustrating a first modification of a cross-sectional shape of an element 16; FIG. 11B is an explanatory view illustrating a second modification of a cross-sectional shape of an element 16; and FIG. 11C is an explanatory view illustrating a third modification of a cross-sectional shape of an element 16.

FIG. 12A illustrates a first modification of a connecting path of parallel resonators in an element 16; FIG. 12B illustrates a second modification of a connecting path of parallel resonators in an element 16; and FIG. 12C illustrates a third modification of a connecting path of parallel resonators in an element 16.

FIG. 19A is a side view of an antenna device 1A; FIG. 19B is a plan view of a radiating element 13A in an antenna 10A; and FIG. 19C is an enlarged view of an external connecting portion 50A.

FIG. 21A is a perspective view of a parallel resonator 20B; and FIG. 21B is an exploded perspective view of a parallel resonator 20B.

FIG. 24A is a perspective view of parallel resonators 20B and 30B immediately adjacent to each other; and FIG. 24B is an exploded perspective view obtained by separating parallel resonators 20B and 30B immediately adjacent to each other.

FIG. 26A illustrates a first modification of a connecting path of parallel resonators in an element 16B, FIG. 26B illustrates a second modification of a connecting path of parallel resonators in an element 16B; and FIG. 26C illustrates a third modification of a connecting path of parallel resonators in an element 16B.

FIG. 27A is a side view of an antenna device 1C; and FIG. 27B is an enlarged view of an external connecting portion 50C.

DESCRIPTION OF EMBODIMENTS

Figure 1:
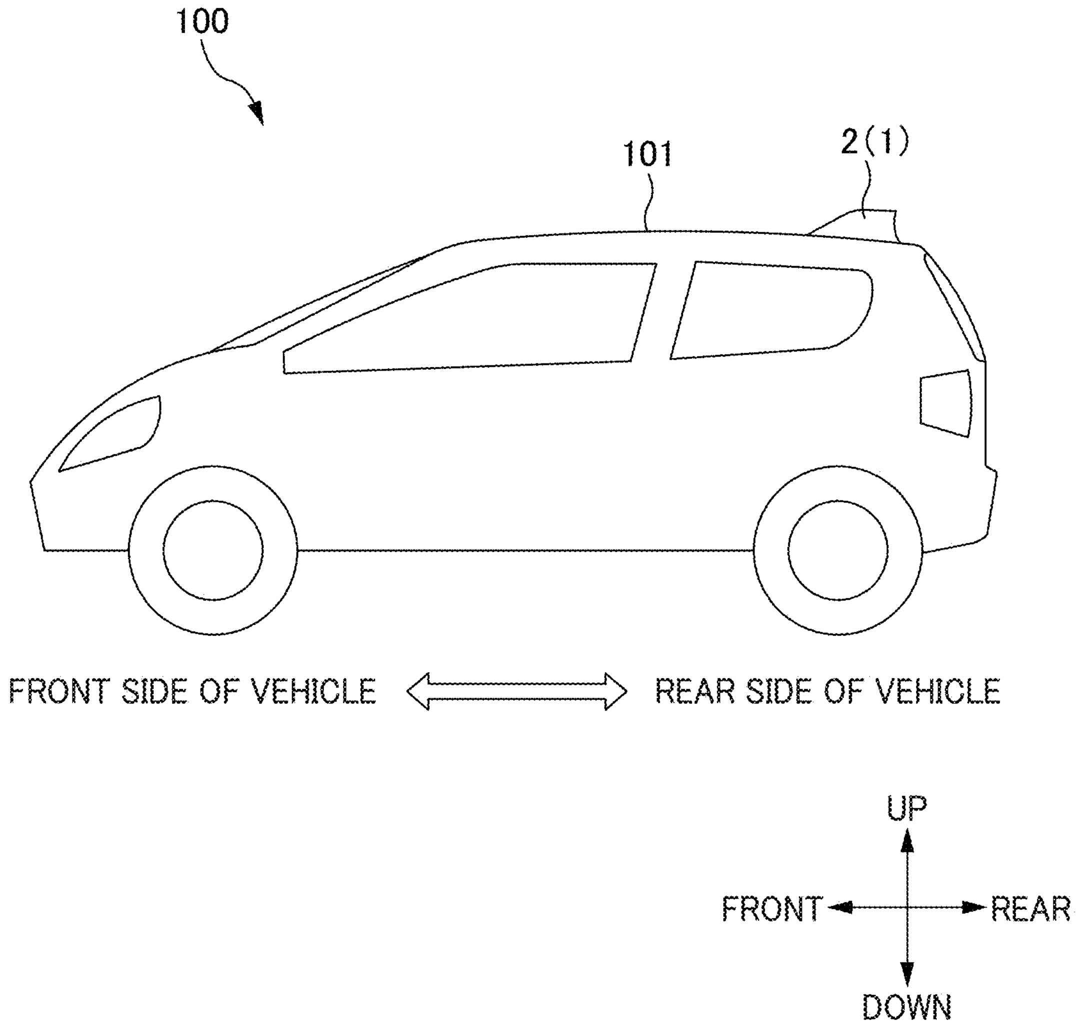
FIG. 1 is a side view of a vehicle 100.

At least following matters will become apparent from the descriptions of the present specification and the accompanying drawings.

Hereinafter, preferred embodiments of the present disclosure will be described with reference to the drawings. Elements, members, and the like that are the same or equivalent in the drawings will be given the same reference signs, and a description thereof is omitted as appropriate.

First Embodiment

Before an antenna device 1 in an embodiment of the present disclosure will be explained, the definitions of directions and the like of the antenna device 1 and the outer shape and mounting position of the antenna device 1 will be explained with reference to FIGS. 1 and 2.

FIG. 1 is a side view of a vehicle 100. FIG. 2 is a view for explaining an overview of the antenna device 1 in the first embodiment.

<<Definitions of Directions and the Like>>

Figure 2:
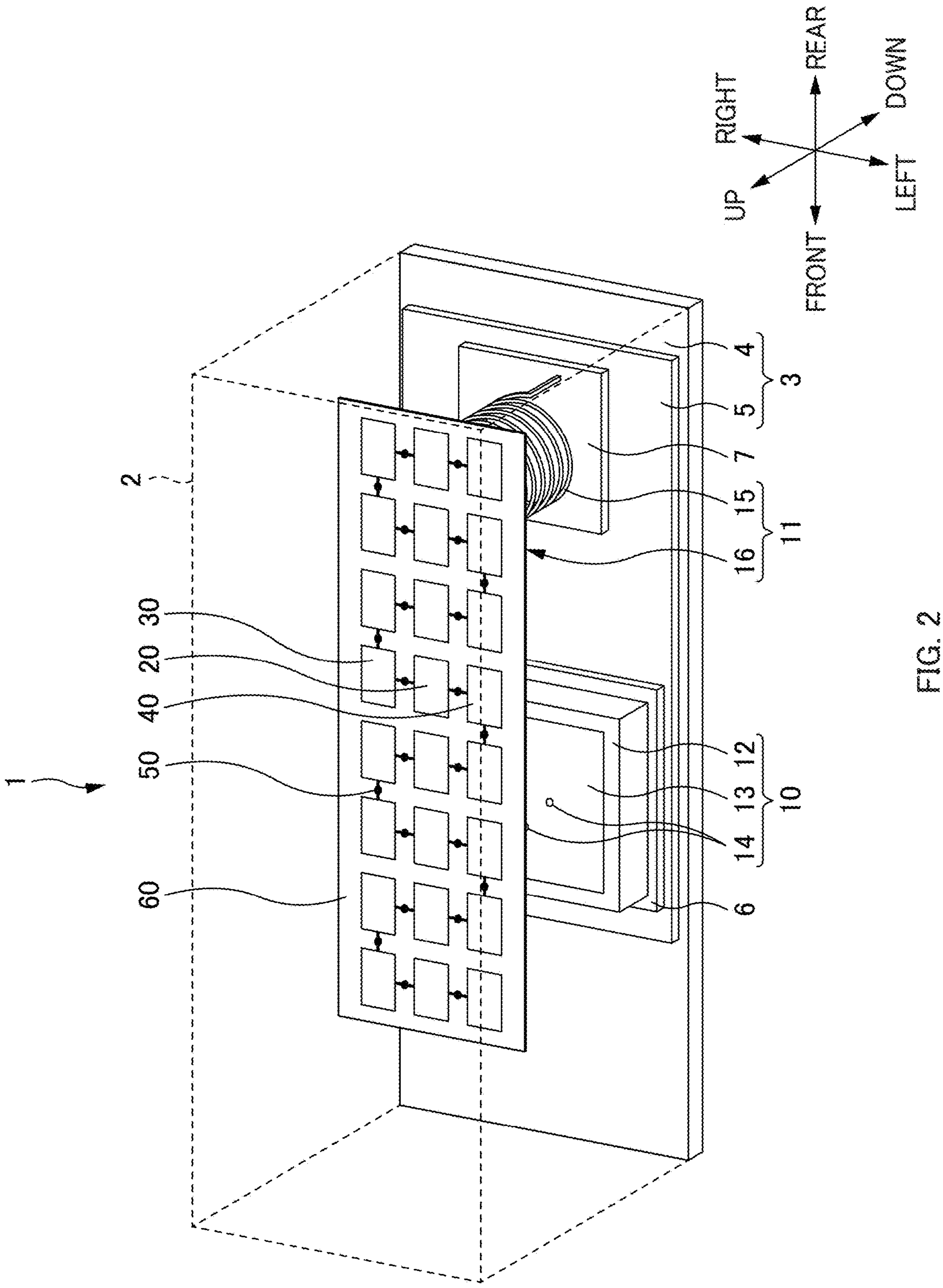
FIG. 2 is a view for explaining an overview of an antenna device 1 in a first embodiment.

The directions and the like (front-rear direction, left-right direction, and up-down direction) of the antenna device 1 will be defined below as illustrated in FIGS. 1 and 2. The front-rear direction, the left-right direction, and the up-down direction of the antenna device 1 are the same as the front-rear direction, the left-right direction, and the up-down direction of the vehicle 100 to which the antenna device 1 is mounted. Specifically, the front-side direction from (front side of) a driver's seat of the vehicle 100 is the front direction (forward) of the antenna device 1, the rightward direction from the driver's seat of the vehicle 100 is the right direction of the antenna device 1, and the zenith direction from the driver's seat of the vehicle 100 is the upward direction (upward) of the antenna device 1. Also, the directions opposite to the forward direction, the right direction, and the upward direction are defined as the rearward direction (rearward), the left direction, and the downward direction (downward), respectively. The front-rear direction may be referred to as a longitudinal direction, the left-right direction may be referred to as lateral direction or width direction, and the up-down direction may be referred to as vertical direction or height direction.

Figure 4:
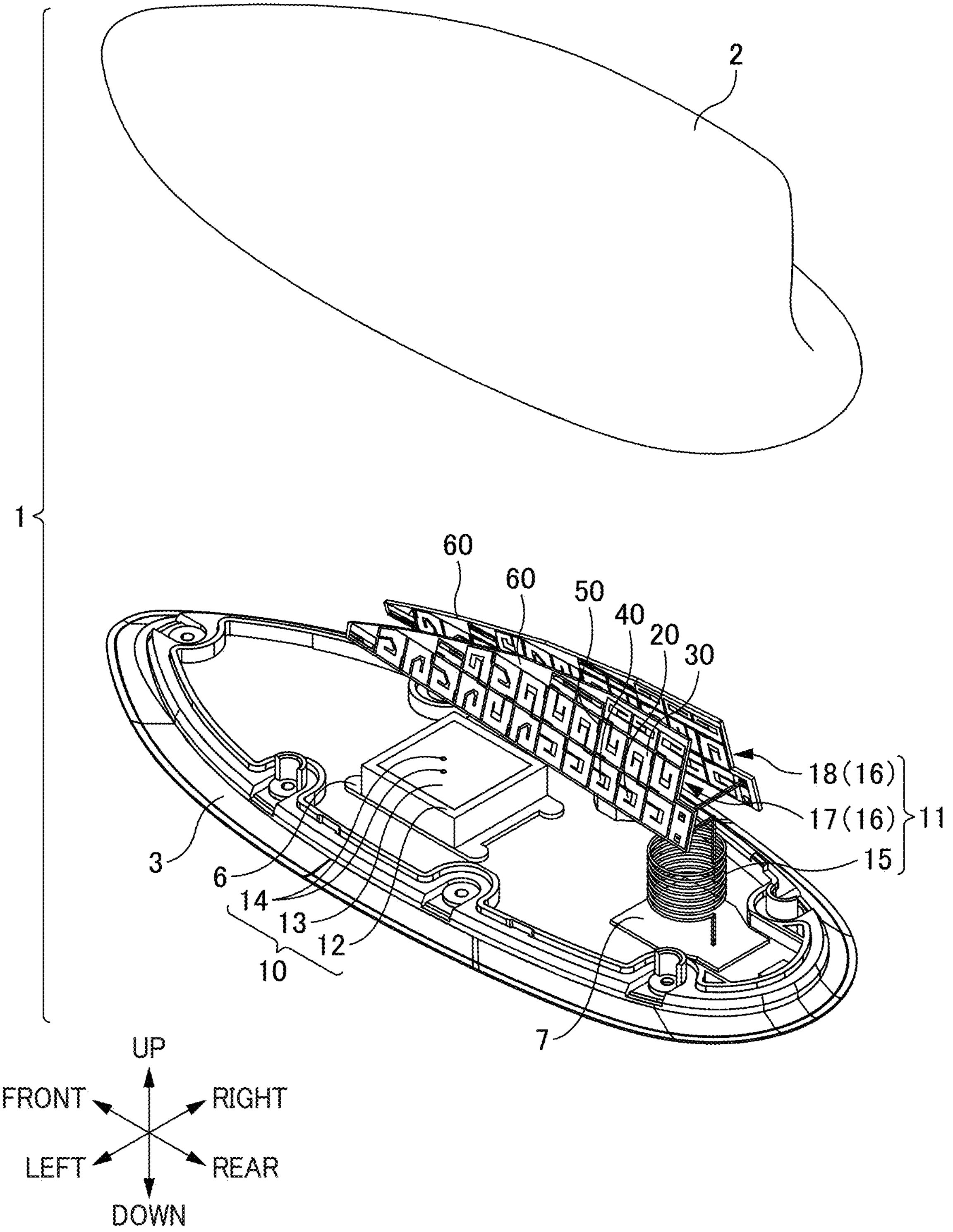
FIG. 4 is a perspective view of an antenna device 1 in a first embodiment.

In FIGS. 1 and 2, each of the front-rear direction, the left-right direction, and the up-down direction is indicated by arrows in order to facilitate understanding of the directions and the like of the antenna device 1. The intersection of these arrows does not mean the coordinate origin. Moreover, an external appearance of the antenna device 1 in an embodiment of the present disclosure is designed such that the front thereof is tapered and the width thereof in the left-right direction gradually decreases from the mounting surface thereof to be mounted to the vehicle 100 toward the top thereof as illustrated in FIG. 4, which will be described later. Thus, the features of such a design may help understanding of the directions and the like.

The above definitions of the directions and the like are common to other embodiments in the present specification.

Hereinafter, the outer shape and mounting position of the antenna device 1 will be described with reference to FIG. 1.

<<Outer Shape and Mounting position of Antenna Device 1>>

In an embodiment of the present disclosure, the outer shape of the antenna device 1 (i.e., the outer shape of a case 2, which will be described later) is a fin shape (i.e., a shark fin shape) for regulating flow of running wind when the vehicle 100 is running, to reduce the fluid resistance. Specifically, when viewed from above, the outer shape of the antenna device 1 in an embodiment of the present disclosure is such that the front thereof is tapered and the width thereof in the left-right direction increases toward the rear thereof. In addition, when viewed from the rear, the outer shape of the antenna device 1 in an embodiment of the present disclosure is such that the width thereof in the left-right direction gradually decreases from the mounting surface thereof to be mounted to the vehicle 100 toward the top thereof. That is, the antenna device 1 in an embodiment of the present disclosure has a streamlined outer shape in which the width and height thereof relatively decrease and the side-faces thereof are inwardly curved toward the front end. However, the outer shape of the antenna device 1 is not limited to this, but may be any one of various shapes such as a cube, a rectangular parallelepiped, a cone, a pyramid, and a sphere or may be a combination thereof.

Moreover, the antenna device 1 in an embodiment of the present disclosure is mounted, for example, to a rear upper surface of a roof 101 of the vehicle 100 as illustrated in FIG. 1. However, the mounting position of the antenna device 1 may be changed as appropriate depending on an environmental condition such as an assumed communication target.

The antenna device 1 can be mounted at any of various positions of the vehicle 100, such as an upper part of a dashboard, a bumper, a mounting part of a license plate, a pillar part, and the like.

Further, the antenna device 1 may be housed, for example, in a cavity between a roof panel and a roof lining of a ceiling surface of a vehicle interior in the vehicle 100, although not illustrated in FIG. 1. The roof panel of the vehicle 100 is formed of, for example, an insulating resin so that the antenna device 1 can receive electromagnetic waves (hereinafter also referred to as "radio waves"). The antenna device 1 housed in the cavity between the roof panel and the roof lining of the ceiling surface of the vehicle interior in the vehicle 100 is fixed, for example, with screws and/or the like to the roof lining formed of an insulating resin. However, the antenna device 1 housed in the cavity may be fixed to a flame or the roof panel of the vehicle 100.

<<Overview of Antenna Device 1>>

Next, the overview of the antenna device 1 in an embodiment of the present disclosure will be described with reference to FIG. 2. FIG. 2 illustrates the antenna device 1 in an embodiment of the present disclosure simply by schematically illustrating the antenna device 1 and constituents included in the antenna device 1 (e.g., an antenna 11, which will be described later). In addition, in FIG. 2, in order to illustrate the inside of the antenna device 1 in an embodiment of the present disclosure, illustration of the case 2, which will be described later, is omitted and the outer shape of the case 2 is indicated by broken lines.

The antenna device 1 is an antenna device including multiple antennas. As illustrated in FIG. 2, the antenna device 1 includes the case 2, a base 3, a substrate 6, a substrate 7, an antenna 10, and the antenna 11.

<Case 2>

The case 2 is a member configured to form an accommodation space for the antennas 10 and 11 with the base 3. In an embodiment of the present disclosure, the case 2 forms a top surface of the antenna device 1. In an embodiment of the present disclosure, the case 2 is formed of an insulating resin material. However, the case 2 may be formed of a material that is other than the insulating resin material and that allows radio waves to be transmitted therethrough. Further, the case 2 may include a portion formed of an insulating resin material and a portion formed of another material allowing radio waves to be transmitted therethrough, and these materials may be combined freely. The case 2 is fixed to the base 3 with screws not illustrated. However, those fixing the case 2 to the base 3 are not limited to screws, and may be snap fit, welding, adhesion, and/or the like.

<Base 3>

The base 3 is a member forming the accommodation space for the antennas 10 and 11 with the case 2. In an embodiment of the present disclosure, the base 3 forms a bottom surface of the antenna device 1. The base 3 includes an insulating base 4 and a metal base 5 as illustrated in FIG. 2.

The insulating base 4 is a plate-shaped member formed of an insulating resin material. However, the insulating base 4 may be formed of any material other than a resin material, as long as it is an insulating material, and may have a shape other than a plate shape. The metal base 5 is attached to the insulating base 4 with screws not illustrated.

The metal base 5 is a member configured to function as a ground of the antenna device 1. The metal base 5 is a plate-shaped metal member and is a die-cast product of an aluminum alloy or the like. However, the metal base 5 may have a shape other than a plate shape, as long as it is a metal member configured to function as the ground, and may be formed of a metal plate. As illustrated in FIG. 2, the substrate 6 connected to the antenna 10 and the substrate 7 connected to the antenna 11 are mounted to the metal base 5. In other words, the antenna 10 is mounted to the metal base 5 through the substrate 6, and the antenna 11 is mounted to the metal base 5 through the substrate 7.

As illustrated in FIG. 1, when the antenna device 1 is mounted to the roof 101, the metal base 5 is electrically connected to the roof 101. Thus, the metal base 5 functions as the ground for the antennas 10 and 11 included in the antenna device 1. The metal base 5 is provided as a single metal base to which the substrate 6 and the substrate 7 are mounted, but may be provided as separate metal bases to which the substrate 6 and the substrate 7 are respectively mounted. Even if provided as the separate metal bases as such, the metal base 5 also functions appropriately as the ground for the antennas 10 and 11.

The antenna device 1 is described above as including the base 3 as a member forming the bottom face of the antenna device 1. Further, the base 3 is described as including the insulating base 4 and the metal base 5 configured to function as the ground. However, the configuration of the base 3 is not limited to the above.

For example, the base 3 may include only the metal base 5, may include the insulating base 4, the metal base 5, and another metal base, or may include a metal plate in place of the metal base. Moreover, the base 3 may include the insulating base 4 and a metal plate in place of the metal base.

In the antenna device 1 in an embodiment of the present disclosure, the members described above may be freely combined as a member forming the bottom face of the antenna device 1 and a member functioning as the ground.

In an embodiment of the present disclosure, the case 2 and the base 3 house the antennas 10 and 11. In other words, the case 2 and the base 3 form the accommodation space to house at least the antennas 10 and 11. However, the case 2 and the base 3 may also house other members other than the antennas 10 and 11. In an embodiment of the present disclosure, the case 2 and the base 3 form a casing of a shark-fin antenna.

<Substrates 6 and 7>

The substrate 6 is a circuit board to which the antenna 10 is to be connected. Meanwhile, the substrate 7 is a circuit board to which the antenna 11 is to be connected. The substrates 6 and 7 are mounted to the metal base 5 as described above. Specifically, the substrates 6 and 7 are mounted to the metal base 5 as separate substrates. In this case, the use of small sized substrates can reduce the cost. However, the substrate to which the antenna 10 is to be connected and the substrate to which the antenna 11 is to be connected may be integrally formed. In this case, the work of assembling the antenna device 1 can be more efficient.

<Antenna 10>

The antenna 10 is, for example, a planar antenna (patch antenna) operating with radio waves in 1.5 GHz band (e.g., L1 band) for global navigation satellite system (GNSS). Thus, the antenna 10 will be referred to as "GNSS antenna" or "patch antenna" below. In an embodiment of the present disclosure, the antenna 10 receives radio waves in the 1.5 GHz band for GNSS. In particular, in an embodiment of the present disclosure, the antenna 10 receives radio waves in a band of 1559 MHz to 1610 MHz for the L1 band. Further, a target frequency in the L1 band is a center frequency in an embodiment of the present disclosure, and the center frequency herein is 1575.42 MHz. As will be described later in second to fifth embodiments, the antenna 10 may operate with radio waves in multiple frequency bands, and may perform at least one of reception or transmission of radio waves in a desired frequency band.

The communication standard and the frequency band in which the antenna 10 operates are not limited to the above, but may be any other communication standards and frequency bands. The antenna 10 may be, for example, a planar antenna (patch antenna) operating with radio waves in 2.3 GHz band for Satellite Digital Audio Radio Service (SDARS).

In addition, the antenna 10 is not limited to the planar antenna, but may be, for example, a monopole antenna, a dipole antenna, a collinear antenna, or a bowtie antenna operating with radio waves in a band of 614 MHz to 5100 MHz (5.1 GHz) for GSM, UMTS, LTE, or 5G, or a broadband antenna based on these antennas.

Further, the antenna 10 may be an antenna operating with radio waves in a frequency band for use in telematics, vehicle-to-everything (V2X: vehicle-to-vehicle communication or road-to-vehicle communication), Wi-Fi, Bluetooth, or DAB. Furthermore, the antenna 10 may be a key-less entry antenna or a smart entry antenna.

Further, the antenna 10 may be an antenna operating with multiple-input multiple-output (MIMO) communications. In this case, the antenna device 1 operates in MIMO communications by additionally including an antenna similar to the antenna 10. The antenna device 1 capable of MIMO communications transmits data from each of the multiple antennas included in the antenna device 1 and receives data using the multiple antennas simultaneously.

The antenna 10 includes a dielectric member 12 and a radiating element 13 as illustrated in FIG. 2.

The dielectric member 12 is a substantially-quadrangular plate-shaped member made of a dielectric material such as ceramic or the like. As illustrated in FIG. 2, the radiating element 13 is mounted to the front surface of the dielectric member 12, meanwhile a pattern (not illustrated) that is a conductor to function as a ground conductor film (or ground conductor plate) is mounted to the back surface of the dielectric member 12. The dielectric member 12 may be a dielectric substrate or may be a solid or hollow resin member.

Here, the term "quadrangular" means a shape formed of four sides, and examples thereof include a square, a rectangle, a trapezoid, a parallelogram, and the like. Then, in a "substantially-quadrangular" shape, at least one of the corners may be cut obliquely with respect to the sides. Moreover, in a "substantially-quadrangular" shape, a notch (recess) or a projection (protrusion) may be provided to a part of any of the sides. The shape of the dielectric member 12 is not limited to a substantially-quadrangular shape, but may be a circular shape, an elliptic shape, a polygonal shape, or the like. Further, the dielectric member 12 may have a shape other than a plate shape, and may have, for example, a columnar shape, a box shape, or a tubular shape.

The radiating element 13 is a substantially-quadrangular conductive member that is smaller than the area of the front surface of the dielectric member 12. As illustrated in FIG. 2, the radiating element 13 is provided to the front surface of the dielectric member 12. The shape of the radiating element 13 is not limited to a substantially-quadrangular shape, but may be a circular shape, an elliptic shape, a polygonal shape, or the like. In other words, the radiating element 13 may have a shape enabling at least one of reception or transmission of radio waves in a desired frequency band (herein, the 1.5 GHz band for GNSS).

The radiating element 13 includes feeding sections 14 as illustrated in FIG. 2. The feeding section 14 is a section including a feeding point at which the radiating element 13 is electrically connected to a feeding line not illustrated. The antenna 10 in an embodiment of the present disclosure employs a configuration including two feeding lines connected to the radiating element 13, in other words, a double-feed system. The radiating element 13 in the double-feed system has a substantially-square shape with substantially equal lengths and widths, so that desired circularly polarized waves can be received. Here, the "substantially-square" shape is a shape included in the "substantially-quadrangular" shape described above.

However, the antenna 10 may employ a configuration including only one feeding line connected to the radiating element 13, in other words, a single-feed system. The radiating element 13 in the single-feed system has a substantially-rectangular shape with different lengths and widths, so that desired circularly polarized waves can be received. The "substantially-rectangular" shape is a shape included in the "substantially-quadrangular" shape.

However, the radiating element 13 in the double-feed system or the single-feed system may be configured such that at least one of reception or transmission of the desired circularly polarized waves can be performed.

The antenna 10 may employ another feed system such as a quadruple-feed system other than the double-feed system and the single-feed system. Further, the antenna 10 may be configured such that at least one of reception or transmission of desired linearly polarized waves, in other words, desired horizontally polarized waves or desired vertically polarized waves, can be performed.

The antenna 10 may operate with radio waves in multiple frequency bands. As will be described later in detail in a second embodiment illustrated in FIGS. 19A to 19C, four slots may be provided along outer edges of the radiating element 13 of the antenna 10. The slots are openings (or holes) formed in the antenna 10 in order to radiate (or reflect) the radio waves in a desired frequency band received by the antenna 10. The frequency bands received by the antenna 10 including the radiating element 13 with the slots include two frequency bands, one of which is determined by outer shape dimensions of the radiating element 13 and the other of which is determined by the length of the slots formed in the radiating element 13. This makes it possible to configure the antenna 10 operating with radio waves in multiple frequency bands.

Further, the antenna 10 may be a multi-layer or multi-stage antenna in the case where the size of the antenna device 1 in the up-down direction is not strictly limited. This makes it possible for the antenna 10 to receive radio waves in multiple frequency bands. For example, the element in the lower layer or lower stage of the antenna 10 may operate with radio waves in a desired frequency band, and the element in the upper layer or upper stage of the antenna 10 may operate with radio waves in a frequency band higher or lower than the desired frequency band. With two or more elements being provided to the antenna 10 as such, it is also possible to configure the antenna 10 operating with radio waves in multiple frequency bands.

<Antenna 11>

The antenna 11 is an antenna operating with radio waves for AM/FM radio, for example. In an embodiment of the present disclosure, the antenna 11 receives, for example, radio waves of 522 kHz to 1710 kHz for AM broadcast and radio waves of 76 MHz to 108 MHz for FM broadcast. Accordingly, the antenna 11 may be referred to as "AM/FM antenna" below.

However, the antenna 11 may receive only one of radio waves for AM broadcast or radio waves for FM broadcast. The communication standard and frequency band in which the antenna 11 operates are not limited to the above, but may be other communication standards and other frequency bands such as a frequency band for use in DAB, as long as the antenna 11 performs at least one of transmission or reception of radio waves in a desired frequency band.

The antenna 11 includes an element 15 and an element 16.

The element 15 is configured to resonate, with the element 16, in the frequency band of radio waves for AM/FM radio. The element 15 is also an inductive element in the antenna 11, and may be referred to as helical element (or simply "coil"). The element 15 is provided to the metal base via the substrate 7 as illustrated in FIG. 2. Then, the element 15 has one end connected to the substrate 7, and the other end to be electrically connected to the element 16.

The element 16 is configured to resonate, with the element 15, in the frequency band of radio waves for AM/FM radio. The element 16 is a capacitive element in the antenna 11, and may be referred to as a capacitive loading element. Further explanation of the element 16 will be described later.

The antenna 11 may include a holder to hold the elements 15 and 16, which are not illustrated in FIG. 2, in addition to the elements 15 and 16.

As described above, the antenna device 1 includes multiple antennas, and is described as including two antennas which are the antenna 10 and the antenna 11 as illustrated in FIG. 2. However, the antenna device 1 may include three antennas including an antenna 19 in addition to the antennas 10 and 11, as will be described later in the fifth embodiment illustrated in FIG. 28, or may include four or more antennas.

<Other Constituent>

The antenna device 1 may include a pad, not illustrated in FIG. 2, sandwiched and fixed between the case 2 and the base 3, in addition to the aforementioned constituents. The pad is soft and insulating, and may be configured to close the gap between the roof 101 and the case 2, and improve the aesthetic appearance and dustproof and waterproof properties.

<<Overview of Element 16>>

The antenna 11 in the antenna device 1 includes the element 16 configured to resonate, with the element 15, in the frequency band of radio waves for AM/FM radio as described above. The following describes the overview of the element 16 of the antenna 11 with reference to FIG. 2.

As illustrated in FIG. 2, the element 16 includes multiple parallel resonators 20, external connecting portions 50, and a base member 60.

The parallel resonators 20 are members configured to resonate in parallel in the frequency band (herein, 1.5 GHz band for GNSS) of radio waves in which the antenna 10 operates. Then, as illustrated in FIG. 2, the element 16 includes multiple (herein, 24) parallel resonators 20.

Hereinafter, parallel resonators immediately adjacent to the parallel resonator 20 via the external connecting portions 50 will be referred to as parallel resonator 30 and parallel resonator 40 as illustrated in FIG. 2. However, distinguishing the parallel resonators 30 and 40 from the parallel resonator 20 is merely for convenience in such a sense that "the parallel resonators 30 and 40 are located so as to be immediately adjacent to the parallel resonator 20 via the external connecting portions 50", and both the parallel resonators 30 and 40 have the same configuration as that of the parallel resonator 20. However, the configuration of each of the parallel resonators 30 and 40 may be partly different from the configuration of the parallel resonator 20. For example, the parallel resonator 30 (or the parallel resonator 40) may be different in shape from the parallel resonator 20.

Accordingly, description of the parallel resonator "20" may be common to the multiple parallel resonators including the parallel resonators 20, 30, and 40, or may be description of any one representative parallel resonator in the multiple parallel resonators. For example, all the multiple parallel resonators may be simply referred to as parallel resonators "20" or any one representative parallel resonator in the multiple parallel resonators may be referred to as parallel resonator "20".

The external connecting portion 50 is a member to connect immediately adjacent parallel resonators 20 to each other. Here, "connecting" is not limited to physical connecting but include "electrically connecting". Further, "electrically connecting" the immediately adjacent parallel resonators 20 to each other includes, for example, connecting the electrically adjacent parallel resonators 20 to each other with a conductor, an electronic circuit, an electronic component, or the like. In an embodiment of the present disclosure, as illustrated in FIG. 2, twenty-three external connecting portions 50 are provided so as to connect all the twenty-four parallel resonators 20 to one another.

In the element 16 in an embodiment of the present disclosure, the multiple parallel resonators 20 connected to the external connecting portions 50 operate, with the element 15, as a single conductor, for the frequency band of radio waves for AM/FM radio. In other words, the element 16 resonates, with the element 15, in the frequency band of radio waves for AM/FM radio.

The element 16 in an embodiment of the present disclosure includes the multiple (herein, 24) parallel resonators 20 connected to the external connecting portions 50.

With the immediately adjacent parallel resonators 20 being connected to each other with the external connecting portions 50 as illustrated in FIG. 2, the element 16 in an embodiment of the present disclosure functions as a capacitive loading element for the frequency band of radio waves for AM/FM radio. In this case, the element 16 may employ any connecting path as long as the parallel resonators are connected such that the element 16 can function as the capacitive loading element for the frequency band of radio waves for AM/FM radio. Thus, the degree of freedom in design is improved. For example, the connecting path of the multiple parallel resonators 20 connected to the external connecting portions 50 may meander. Specifically, for example, the parallel resonators may be connected to form a meandering path while repeatedly turning in the up-down direction (longitudinally meandering path) as illustrated in FIG. 2.

As described above, the multiple parallel resonators 20 connected to the external connecting portions 50 operate, with the element 15, as the single conductor for the frequency band of radio waves in which the antenna 11 operates (herein, the frequency band of radio waves for AM/FM radio).

Moreover, since each of the multiple parallel resonators 20 resonates in the frequency band of radio waves in which the antenna 10 operates (herein, the 1.5 GHz band for GNSS), the antenna 11 in an embodiment of the present disclosure can suppress influence on the characteristics of another antenna (the antenna 10). The following describes suppression of the influence on the characteristics of the antenna 10 with reference to simulation results.

The base member 60 is a plate-shaped member to which the parallel resonators 20 and the external connecting portions 50 are provided. In an embodiment of the present disclosure, the base member 60 is a printed-circuit board (PCB), for example. In the base member 60, a conductive pattern is formed in a resin material such as a glass epoxy resin or the like, for example. However, in the base member 60, a conductive pattern may be formed in a resin material other than a glass epoxy resin, such as a phenolic resin or the like.

However, the entire base member 60 does not need to be formed in a plate shape, and the base member 60 may have a portion formed in a shape other than a plate shape. For example, the base member 60 may be part of the case 2, or part of the holder (not illustrated) to hold the aforementioned elements 15 and 16. In this case, the case 2 and the holder (not illustrated) may be made of a resin, for example.

The base member 60 is not limited to the foregoing configuration, but may be configured with only a conductive pattern. Further, in the case where the base member 60 is configured such that a conductive pattern is formed in a resin material, a molded interconnect device (MID) technique, for example, may be used. This makes it possible to form a conductive pattern in a resin material having a complex three-dimensional shape. It is possible to form a conductive pattern using the MID technique for a resin material having such a shape as of the base member 60 illustrated in FIG. 2, for example.

<<Overview of Parallel Resonator 20>>

The element 16 resonates, with the element 15, in the frequency band of radio waves in which the antenna 11 operates (herein, the radio waves for AM/FM radio), as described above. Further, the element 16 includes the parallel resonators 20 configured to resonate in parallel in the frequency band of radio waves in which the antenna 10 operates (herein, the radio waves for GNSS). The following describes an overview of the parallel resonator 20 configuring the element 16, with reference to FIGS. 3A and 3B.

Figure 3A:
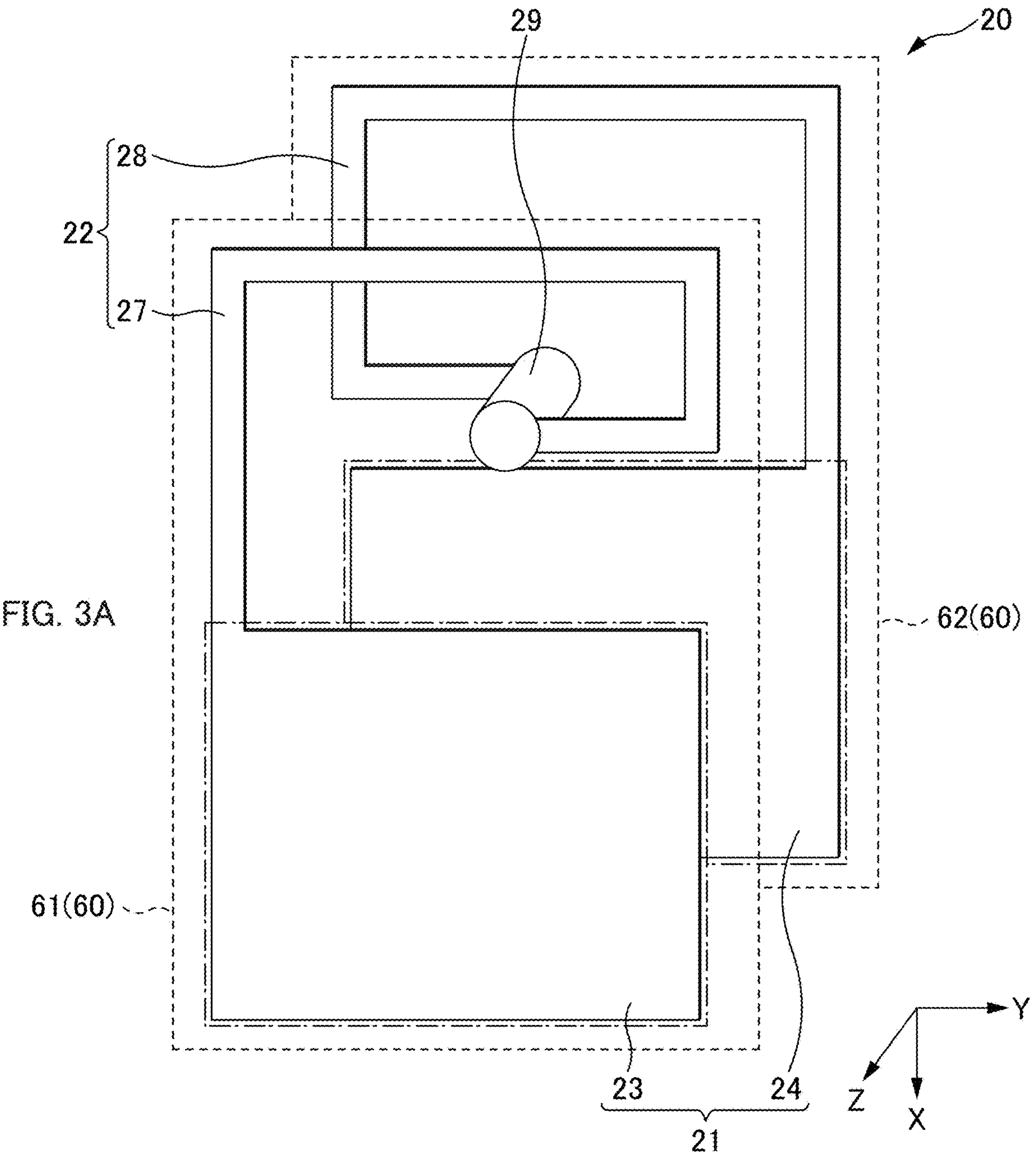
FIGS. 3A and 3B are diagrams for explaining an overview of a parallel resonator 20.
Figure 3B:
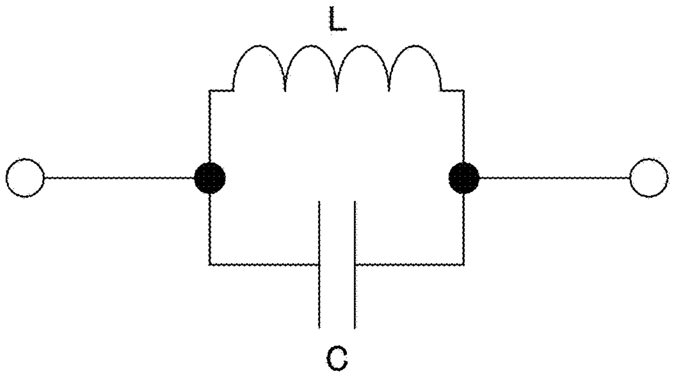

FIGS. 3A and 3B are diagrams for explaining the overview of the parallel resonator 20, and FIG. 3A is an explanatory diagram of the parallel resonator 20. FIG. 3B is a diagram illustrating the parallel resonator 20 as a circuit diagram. FIG. 3A simply illustrates the parallel resonator 20 by schematically illustrating the parallel resonator 20 and constituents included in the parallel resonator 20 (e.g., a capacitor 21, an inductor 22, and the like, which will be described later).

The parallel resonator 20 is not always arranged along the directions and the like of the antenna device 1 (the front-rear direction, the left-right direction, and the up-down direction), and thus the following defines the directions and the like (X direction, Y direction, and Z direction) of the parallel resonator 20 as illustrated in FIGS. 3A and 3B, separately from the directions and the like of the antenna device 1.

In FIG. 3A, the X direction is a direction in which the capacitor 21 (described later) and the inductor 22 (described later) are arranged. Further, +X direction is a direction from the inductor 22 toward the capacitor 21, and −X direction is a direction opposite thereto (direction from the capacitor 21 toward the inductor 22).

In addition, in FIG. 3A, the Z direction is a direction in which a pair of conductors of the capacitor 21 (conductors 23 and 24, which will be described later) are arranged. Further, +Z direction is a direction from the conductor 24 (conductor located in a back surface 62 of the base member 60, which will be described later) toward the conductor 23 (conductor located in a front surface 61 of the base member which will be described later), and −Z direction is a direction opposite thereto (direction from the conductor 23 toward the conductor 24).

In addition, in FIG. 3A, the Y direction is a direction perpendicular to the X direction and the Z direction. Here, +Y direction is a direction indicated with an arrow in FIG. 3A. Then, −Y direction is the direction opposite to the direction indicated with the arrow.

The above definitions of the directions and the like are in common to the other embodiments in the present specification.

As illustrated in FIG. 3A, the parallel resonator 20 includes the capacitor 21 and the inductor 22. In other words, with the parallel resonator being configured with C and L as illustrated in FIG. 3B, the parallel resonator 20 in an embodiment of the present disclosure resonates in the frequency band of radio waves in which the antenna 10 operates (herein, the 1.5 GHz band for GNSS). Here, the capacitor 21 of the parallel resonator 20 corresponds to C illustrated in FIG. 3B, and the inductor 22 of the parallel resonator 20 corresponds to L illustrated in FIG. 3B. Here, the shapes and sizes of the capacitor 21 and the inductor 22 can be adjusted freely depending on the frequency band of radio waves in which the antenna 10 operates.

The capacitor 21 corresponds to a region surrounded by dashed-dotted lines in FIG. 3A, and is a member configured to function as a capacitor in the parallel resonator circuit as given by C in FIG. 3B. The capacitor 21 includes the pair of conductors opposed to each other, which are the conductor 23 and the conductor 24.

The inductor 22 corresponds to a region other than the region surrounded by the dashed-dotted lines in FIG. 3A in the parallel resonator 20, and is a member configured to function as a coil in the parallel resonator circuit as given by L in FIG. 3B. In the parallel resonator 20 in an embodiment of the present disclosure, the inductor 22 is connected in parallel to the capacitor 21.

The inductor 22 includes an arm 27, an arm 28, and an internal connecting portion 29. The arm 27 extends from the conductor 23 and the arm 28 extends from the conductor 24. The internal connecting portion 29 is a member configured to connect the arm 27 and the arm 28.

In the parallel resonator 20 in an embodiment of the present disclosure, as illustrated in FIG. 3A, the conductor 23 and the arm 27 are located in the front surface 61 of the base member 60. Meanwhile, the conductor 24 and the arm 28 are located in the back surface 62 of the base member 60. The "front surface" of the base member 60 is a surface facing the case 2 among the plate surfaces of the element 16 including the parallel resonator 20. The "back surface" of the base member 60 is a surface opposite to the surface facing the case 2. The front surface 61 and the back surface 62 are surfaces opposed to each other. As illustrated in FIG. 3A, the internal connecting portion 29 connects the arm 27 located in the front surface 61 of the base member 60 and the arm 28 located in the back surface 62 of the base member 60.

The shapes, dimensions, and the like of the capacitor 21 and the inductor 22 can be adjusted freely depending on a desired frequency band of radio waves for resonance.

<<Details of Element 16 and Parallel Resonator 20>>

Next, regarding the element 16 and the parallel resonator 20 whose overviews are described above, specific configurations will be described with reference to FIGS. 4 to 7A to 7F.

Figure 5A:
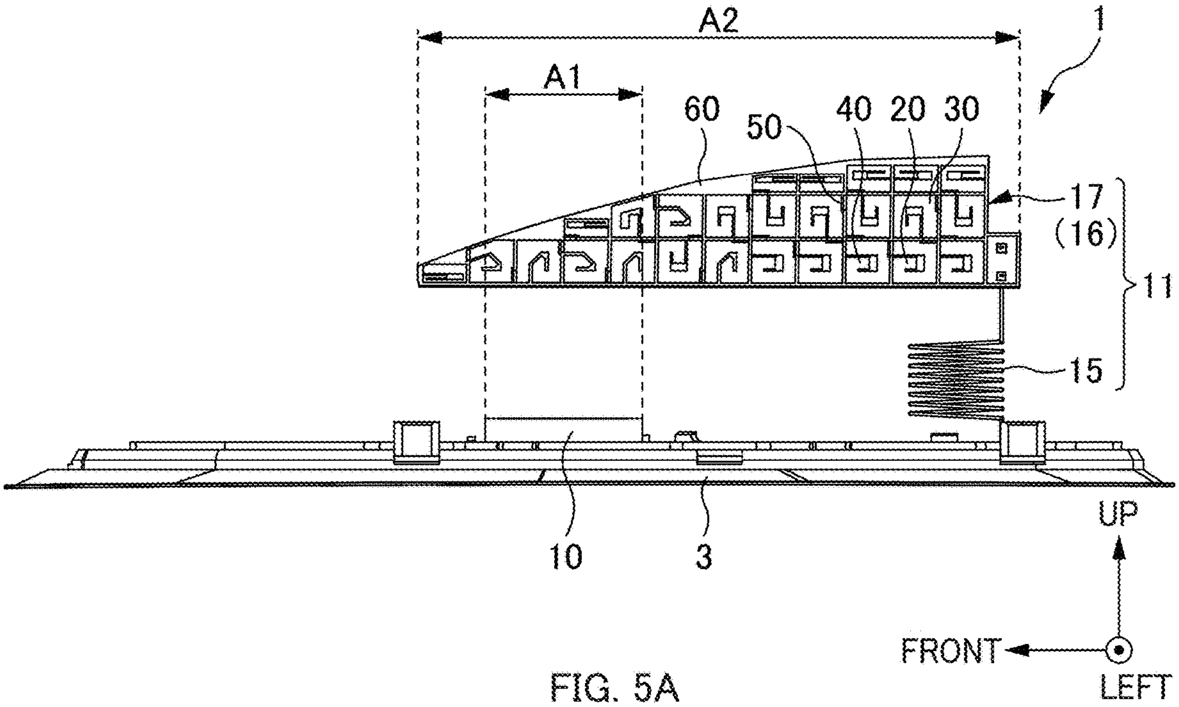
FIGS. 5A and 5B are views illustrating an antenna device 1 in a first embodiment.
Figure 5B:
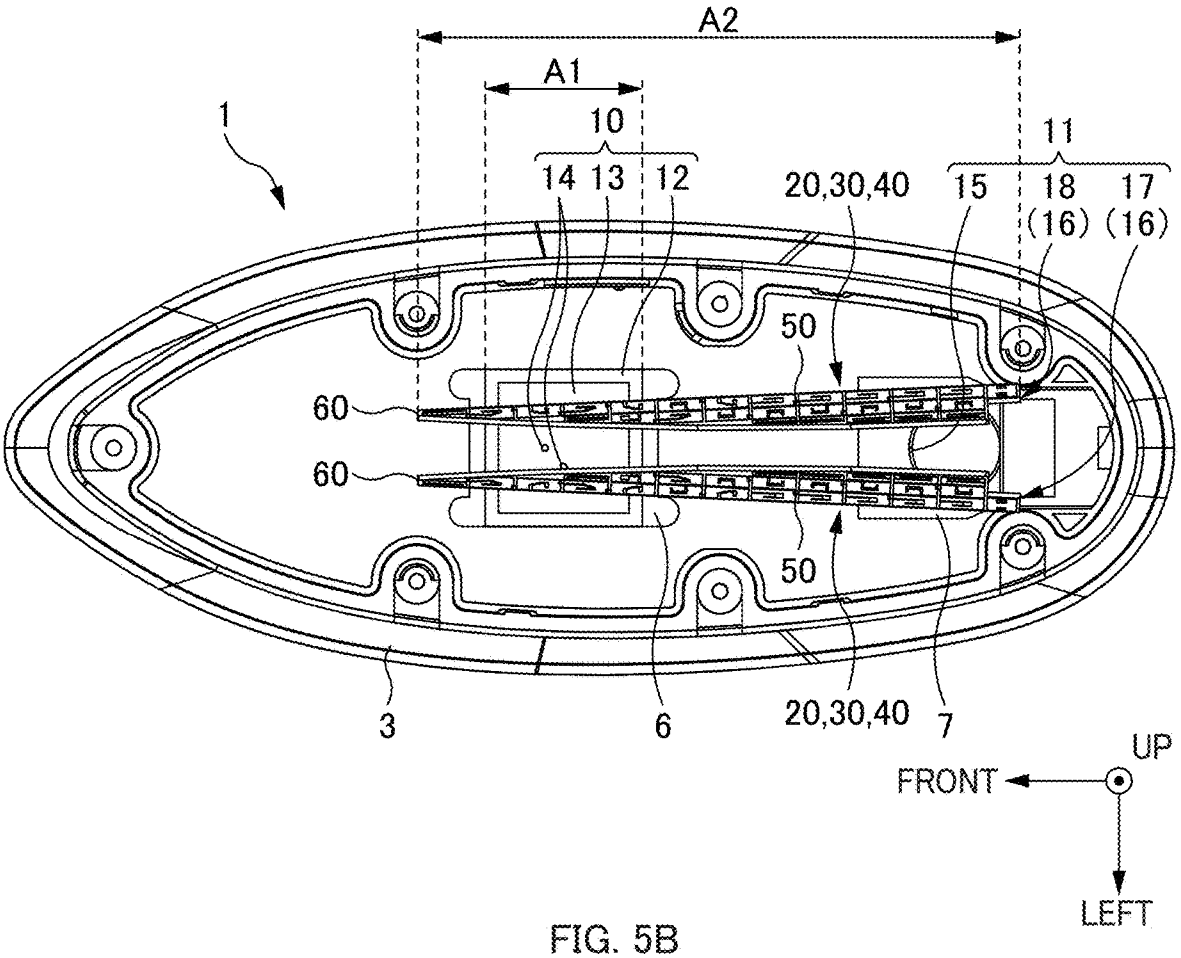
Figure 6A:
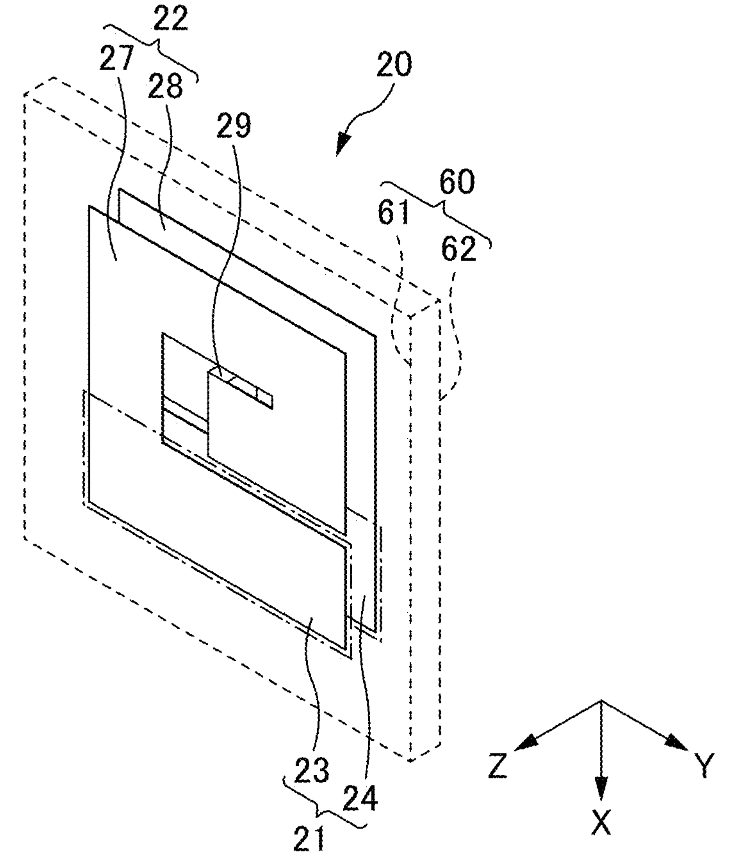
FIGS. 6A and 6B are views illustrating a parallel resonator 20.
Figure 6B:
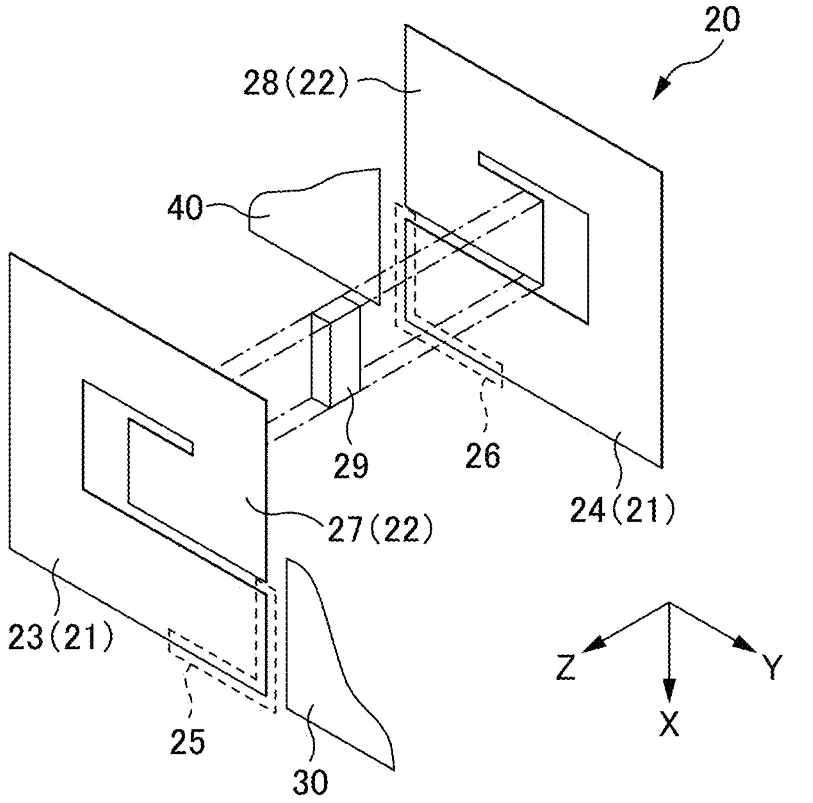

FIG. 4 is a perspective view of the antenna device 1 in the first embodiment. FIGS. 5A and 5B are views illustrating the antenna device 1 in the first embodiment: FIG. 5A is a side view of the antenna device 1; and FIG. 5B is a plan view of the antenna device 1. FIGS. 6A and 6B are views illustrating the parallel resonator 20: FIG. 6A is a perspective view of the parallel resonator 20; and FIG. 6B is an exploded perspective view of the parallel resonator 20. FIGS. 7A to 7F are six face views of the parallel resonator 20.

Figures 7A, 7B, 7C, 7D, 7E, 7F:
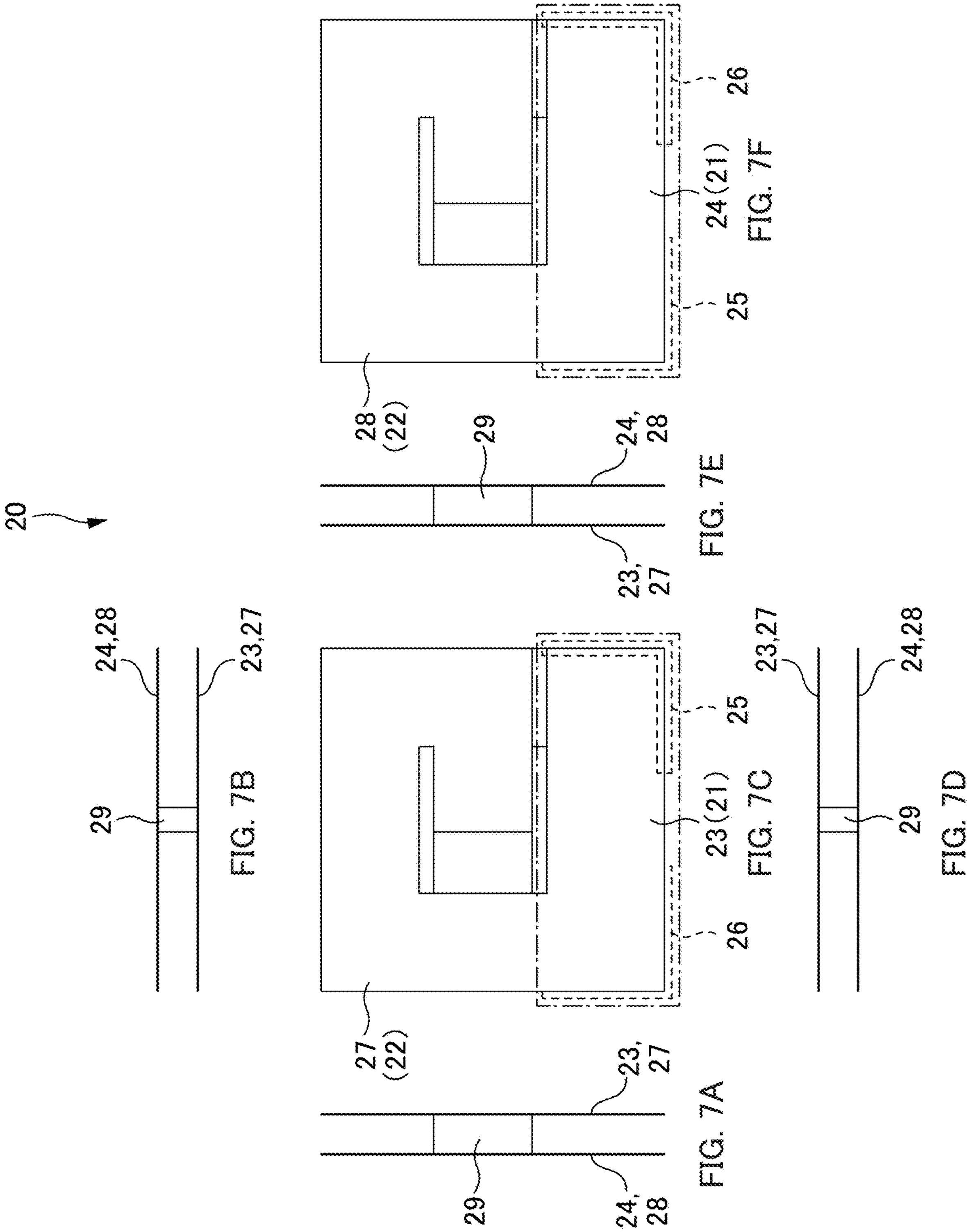
FIGS. 7A to 7F are six face views of a parallel resonator 20.

The plan view illustrated in FIG. 5B is a view of the antenna device 1 when seen from above. Further, in FIGS. 7A to 7F, assuming that the view of the parallel resonator 20 when seen in the −Z direction is a front view, FIG. 7A is a left side view, FIG. 7B is a top view, FIG. 7C is the front view, FIG. 7D is a bottom view, FIG. 7E is a right-side view, and FIG. 7F is a back view.

<Positional Relationship between Antenna 10 and Antenna 11>

In order to describe the element 16 in detail, the positional relationship between the antenna 10 and the antenna 11 will be described first. In the antenna device 1 in an embodiment of the present disclosure, as illustrated in FIGS. 5A and 5B, the antenna 10 and the antenna 11 are located such that at least part of a first area A1 of the antenna 10 overlaps with at least part of a second area A2 of the antenna 11.

Here, the first area A1 is an area in which the antenna 10 exists, the area extending from the frontmost end to the rearmost end of the antenna 10 as illustrated in FIGS. 5A and 5B, in the side view or the top view. Meanwhile, the second area A2 is an area in which the antenna 11 exists, the area extending from the frontmost end to the rearmost end of the antenna 11 as illustrated in FIGS. 5A and 5B, in the side view or the top view.

In the antenna device 1 in an embodiment of the present disclosure, in the side view illustrated in FIG. 5A, the first area A1 of the antenna 10 is included in the second area A2 of the antenna 11. However, for example, when the antenna 10 is formed larger than the antenna 11, the second area A2 of the antenna 11 may be included in the first area A1 of the antenna 10. Further, with the antenna 10 being shifted relative to the antenna 11 to the front side, part of the first area A1 of the antenna 10 may be included in the second area A2 of the antenna 11. When part of the first area A1 of the antenna 10 is included in the second area A2 of the antenna 11, the part of the first area A1 of the antenna 10 results in overlapping with part of the second area A2 of the antenna 11. Furthermore, the first area A1 of the antenna 10 does not have to overlap the second area A2 of the antenna 11.

In the antenna device 1 in an embodiment of the present disclosure, in the top view illustrated in FIG. 5B, the first area A1 of the antenna 10 is included in the second area A2 of the antenna 11. However, for example, when the antenna 10 is formed larger than the antenna 11, the second area A2 of the antenna 11 may be included in the first area A1 of the antenna 10. Further, with the antenna 10 being shifted relative to the antenna 11 to the right side or the left side, part of the first area A1 of the antenna 10 may be included in the second area A2 of the antenna 11. When part of the first area A1 of the antenna 10 is included in the second area A2 of the antenna 11, the part of the first area A1 of the antenna 10 results in overlapping with part of the second area A2 of the antenna 11. Furthermore, the first area A1 of the antenna 10 does not have to overlap the second area A2 of the antenna 11.

In the antenna device 1 in an embodiment of the present disclosure, at least part of the first area A1 of the antenna overlaps with at least part of the second area A2 of the antenna 11, in the side view and the top view. However, for example, the positional relationship may be such that the first area A1 of the antenna 10 overlaps with the second area A2 of the antenna 11 in the side view, while the first area A1 of the antenna 10 does not overlap the second area A2 of the antenna 11 in the top view.

As described above, the multiple parallel resonators 20 operate with the element 15 as a single conductor, for the frequency band of radio waves for AM/FM radio. Moreover, the multiple parallel resonators 20 resonate in the frequency band of radio waves in which the antenna 10 operates (herein, the 1.5 GHz band for GNSS). Accordingly, the multiple parallel resonators 20 can suppress the influence of their operations as the single conductor upon the frequency band of radio waves in which the antenna 10 operates. This makes it possible to suppress the influence of the antenna 11 (the element 16 in particular) on the characteristics of the antenna 10, even when the position and area of the antenna 10 overlap the position and area of the antenna 11.

<Details of Element 16>

In an embodiment of the present disclosure, the element 16 includes two assemblies, which are an assembly 17 and an assembly 18 as illustrated in the top view of FIG. 5B. Each of the assemblies 17 and 18 includes multiple parallel resonators 20, external connecting portions 50, and a base member 60. The assemblies 17 and 18 are spaced apart from each other and both thereof are connected to the element 15.

Each of the assemblies 17 and 18 is inclined with respect to a plane perpendicular to the plate surface of the base 3. Specifically, the assembly 17 is inclined to the left as it goes downward, meanwhile the assembly 18 is inclined to the right as it goes downward. In other words, a distance between opposed points at the lower edges of the assemblies 17 and 18 is larger than a distance between opposed pointes at the upper edges of the assemblies 17 and 18. In other words, the assemblies 17 and 18 in an embodiment of the present disclosure are configured such that the distance between their upper edges is smaller than the distance between their lower edges. Accordingly, when the outer shape of the antenna device is a fin shape (i.e., a shark fin shape), the element 16 can be arranged along the inner shape of the fin-shaped case 2, which makes it possible to ensure the characteristics of the antenna 11 while maximizing the use of the space inside the case 2.

However, the assemblies 17 and 18 may be arranged in parallel with the plane perpendicular to the plate surface of the base 3 or may be arranged in parallel with the plate surface of the base 3. Further, the assemblies are not limited to two but may be three or more. Further, the element 16 may include only one assembly, and may be configured as a single plate-shaped member as illustrated in the explanatory view of the antenna device 1 illustrated in FIG. 2.

As the details will be described in modifications of a cross-sectional shape of the element 16 illustrated in FIGS. 11A to 11C, which will be described later, the element 16 may be configured such that the upper edges of the assemblies 17 and 18 are connected to each other (inverted V shape or inverted U shape illustrated in FIGS. 11B and 11C, respectively). Further, the element 16 may be configured such that the lower edges of the assemblies 17 and 18 are connected to each other (V shape or U shape). Moreover, the assemblies 17 and 18 are configured such that the distance between their upper edges is smaller than the distance between their lower edges in an embodiment of the present disclosure, but may be configured such that the distance between their upper edges is larger than the distance between their lower edges.

Further, in the case where the element 16 is configured with one single assembly, the assembly may be arranged in parallel with the plane perpendicular to the plate surface of the base 3 (I shape). Further, in the case where the element 16 is configured with one single assembly, the assembly may be arranged in parallel with the plate surface of the base 3 (shape of minus sign).

<Details of Parallel Resonator 20>

As described above, the parallel resonator 20 includes the capacitor 21 and the inductor 22. The capacitor 21 corresponds to the region surrounded by the dashed-dotted lines in FIG. 6A, and the inductor 22 corresponds to the region other than the region surrounded by the dashed-dotted lines in FIG. 6A, in the parallel resonator 20.

In an embodiment of the present disclosure, as illustrated in FIGS. 6A and 6B, the parallel resonator 20 has a configuration in which a pair of plate-shaped members configuring the capacitor 21 and the inductor 22 are connected to the internal connecting portion 29. Specifically, a portion configured with the conductor 23 and the arm 27 that are located in the front surface 61 of the base member 60 are connected to a portion configured with the conductor 24 and the arm 28 that are located in the back surface 62 of the base member 60 with the internal connecting portion 29. With such a configuration, the parallel resonator 20 is formed as a distributed constant circuit.

In an embodiment of the present disclosure, the parallel resonator 20 is configured such that the maximum dimension thereof is small. The maximum dimension herein is the longest distance between two points among distances between pairs of two points in the outer shape of the parallel resonator 20. The maximum dimension is the dimension of a part having the largest dimension among the diagonals of the three-dimensional shape and all the sides constituting the structure (length, width, height, thickness, and diameter), for example. With a configuration of the parallel resonator 20 having a small maximum dimension, the multiple parallel resonators 20 can suppress the influence of their operations as a single conductor upon the frequency band of radio waves in which the antenna 10 operates. Thus, the influence on the characteristics of the antenna 10 can be suppressed.

Specifically, in an embodiment of the present disclosure, the maximum dimension of the parallel resonator 20 is equal to or smaller than one tenth of the wavelength of radio waves with which the antenna 10 operates. However, as long as the influence on the characteristics of the antenna 10 can be suppressed, the maximum dimension of the parallel resonator 20 may be larger than one tenth of the wavelength of radio waves with which the antenna 10 operates.

In an embodiment of the present disclosure, the internal connecting portion 29 is located closer to the center of the outer shape of the parallel resonator 20 than to the outer edge of the outer shape thereof in the plan views of the parallel resonator 20 illustrated in FIGS. 7A to 7F. The "center" mentioned herein is the geometric center of the outer shape of the parallel resonator 20. Specifically, the arm 27 of the inductor 22 is formed to extend from the conductor 23 of the capacitor 21 and then extend from the outer edge side to the inner side of the outer shape of the parallel resonator 20. In other words, the arm 27 of the inductor 22 forms a spiral extending from the conductor 23 of the capacitor 21 and turning round from the outer edge side toward the center of the outer shape of the parallel resonator 20, or the arm 27 of the inductor 22 forms a spiral turning round from the center toward the outer edge of the outer shape of the parallel resonator 20 and the arm 27 is connected to the conductor 23 of the capacitor 21.

Meanwhile, the arm 28 of the inductor 22 is formed to extend from the conductor 24 of the capacitor 21 and then extend from the outer edge side to the inner side of the outer shape of the parallel resonator 20. In other words, the arm 28 of the inductor 22 forms a spiral extending from the conductor 24 of the capacitor 21 and turning round from the outer edge side toward the center of the outer shape of the parallel resonator 20, or the arm 28 of the inductor 22 forms a spiral turning round from the center toward the outer edge of the outer shape of the parallel resonator 20 and the arm 28 is connected to the conductor 24 of the capacitor 21. Then, the arm 27 and the arm 28 are connected to each other with the internal connecting portion 29 at a position closer to the center of the outer shape of the parallel resonator 20 than to the outer edge thereof. With the parallel resonator 20 being configured as such, the maximum dimension of the parallel resonator 20 can be made small.

However, as long as the parallel resonator 20 can be formed with the maximum dimension thereof being equal to or smaller than one tenth of the wavelength of radio waves with which the antenna 10 operates, the position of the internal connecting portion 29 is not limited to the center side of the outer shape of the parallel resonator 20 but may be closer to the outer edge side of the outer shape of the parallel resonator 20.

In an embodiment of the present disclosure, the internal connecting portion 29 is a conducting portion formed using a through hole or a via hole formed in the base member 60. With this, the arm 27 and the arm 28 are connected to each other.

In an embodiment of the present disclosure, the outer shape of the parallel resonator 20 is a quadrangular shape and more specifically a substantially square shape in the plan view of the parallel resonator 20 illustrated in FIGS. 7C and 7F (7C: front view or 7F: back view). However, the outer shape of the parallel resonator 20 may be a quadrangular shape other than a substantially square shape or a circular shape as in modifications of the parallel resonator 20 illustrated in FIGS. 13 to 18F, which will be described later. In addition, although not illustrated, the outer shape of the parallel resonator 20 may be any one of shapes including a polygonal shape, such as a triangular shape and a pentagonal shape, an elliptical shape, a semi-circular shape, and a semi-elliptical shape or may be a combination of some of the foregoing shapes.

As illustrated in FIG. 6B, the parallel resonator 20 in an embodiment of the present disclosure includes a connecting region 25 to be connected to the parallel resonator 30 immediately adjacent thereto and a connecting region 26 to be connected to the parallel resonator 40 immediately adjacent thereto. The connecting region 26 is located in a region other than a region opposed to the connecting region 25, in the back surface 62. In other words, the connecting region 25 is located in a region other than a region opposed to the connecting region 26, in the front surface 61.

In the plan views of the parallel resonator 20 illustrated in FIGS. 7A to 7F, the connecting region 26 is located in a region, in the back surface 62, that is line symmetric to the region opposed to the connecting region 25 with respect to a straight line passing through the center of the outer shape of the parallel resonator 20, or that is point symmetric thereto with respect to the center of the outer shape of the parallel resonator 20. In other words, the connecting region 25 is located in a region, in the front surface 61, that is line symmetric to the region opposed to the connecting region 26 with respect to a straight line passing through the center of the outer shape of the parallel resonator 20, or that is point symmetric thereto with respect to the center of the outer shape of the parallel resonator 20.

<<Details of External Connecting Portion 50>>

Next, regarding the external connecting portion 50 whose overview is described above, a specific configuration will be described with reference to FIGS. 8A to 8C.

Figure 8A:
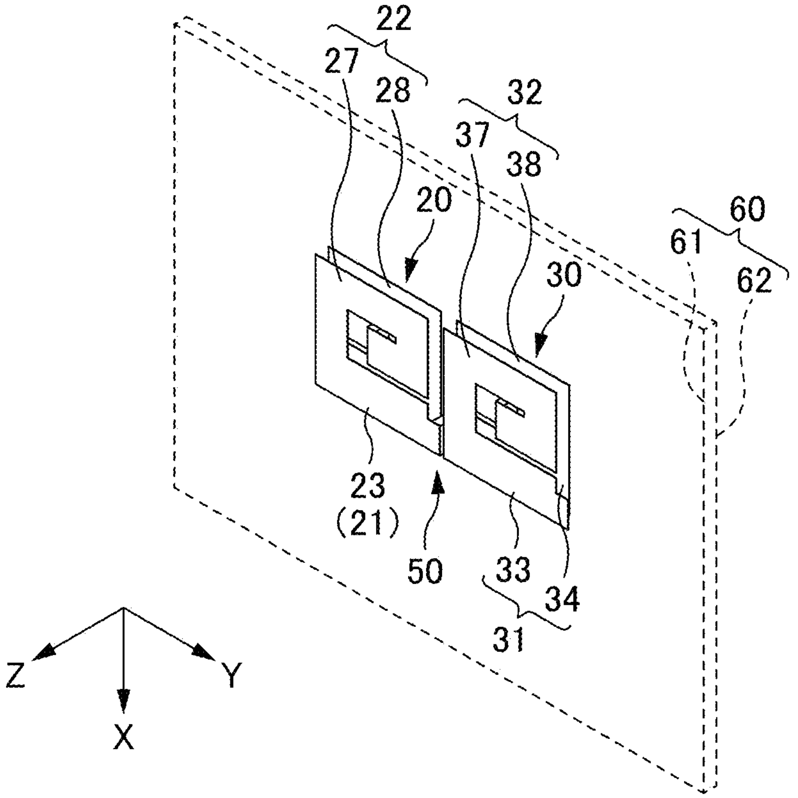
FIGS. 8A to 8C are views illustrating parallel resonators 20 and 30 immediately adjacent to each other.
Figure 8B:
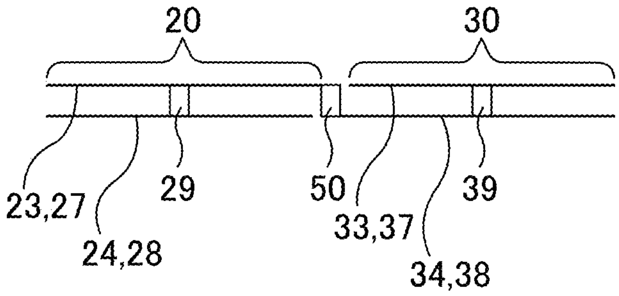
Figure 8C:
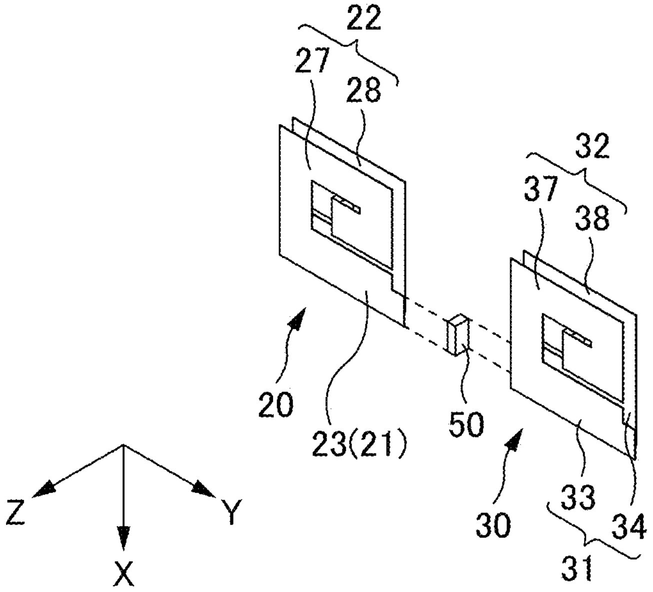

FIGS. 8A to 8C are views illustrating the parallel resonators 20 and 30 immediately adjacent to each other: FIG. 8A is a perspective view of the parallel resonators 20 and 30 immediately adjacent to each other; FIG. 8B is a side view of the parallel resonators 20 and 30 immediately adjacent to each other; and FIG. 8C is an exploded perspective view obtained by separating the parallel resonators 20 and 30 immediately adjacent to each other.

As illustrated in FIGS. 8A to 8C, the parallel resonator 30 also includes a capacitor 31 and an inductor 32 as in the parallel resonator 20. The capacitor 31 includes a pair of conductors opposed to each other, which are a conductor 33 located in the front surface 61 and a conductor 34 located in the back surface 62. The inductor 32 is connected in parallel to the capacitor 31, and includes an arm 37, an arm 38, and an internal connecting portion 39 configured to connect the arm 37 and the arm 38 to each other.

As illustrated in FIG. 8C, the external connecting portion 50 connects the capacitor 21 of the parallel resonator and the capacitor 31 of the parallel resonator 30. In an embodiment of the present disclosure, the external connecting portion 50 connects the conductor 23 located in the front surface in the capacitor 21 of the parallel resonator 20 and the conductor 34 located in the back surface in the capacitor 31 of the parallel resonator 30.

In an embodiment of the present disclosure, the external connecting portion 50 is a conducting portion formed using a through hole or a via hole formed in the base member 60. With this, the conductor 23 and the conductor 34 are connected to each other.

In an embodiment of the present disclosure, the external connecting portion 50 is also configured such that the maximum dimension thereof is small as in the parallel resonator 20. With a configuration of the external connecting portion 50 having a small maximum dimension, the influence on the characteristics of the antenna 10 can be suppressed.

Specifically, in an embodiment of the present disclosure, the maximum dimension of the external connecting portion 50 is equal to or smaller than one tenth of the wavelength of radio waves with which the antenna 10 operates. However, as long as the influence on the characteristics of the antenna 10 can be suppressed, the maximum dimension of the external connecting portion 50 may be larger than one tenth of the wavelength of radio waves with which the antenna 10 operates.

<<Comparative Example>>

Next, an antenna 11A in Comparative Example illustrated in FIGS. 9A and 9B will be described in order to explain characteristics of the antenna 11 in an embodiment of the present disclosure.

Figure 9A:
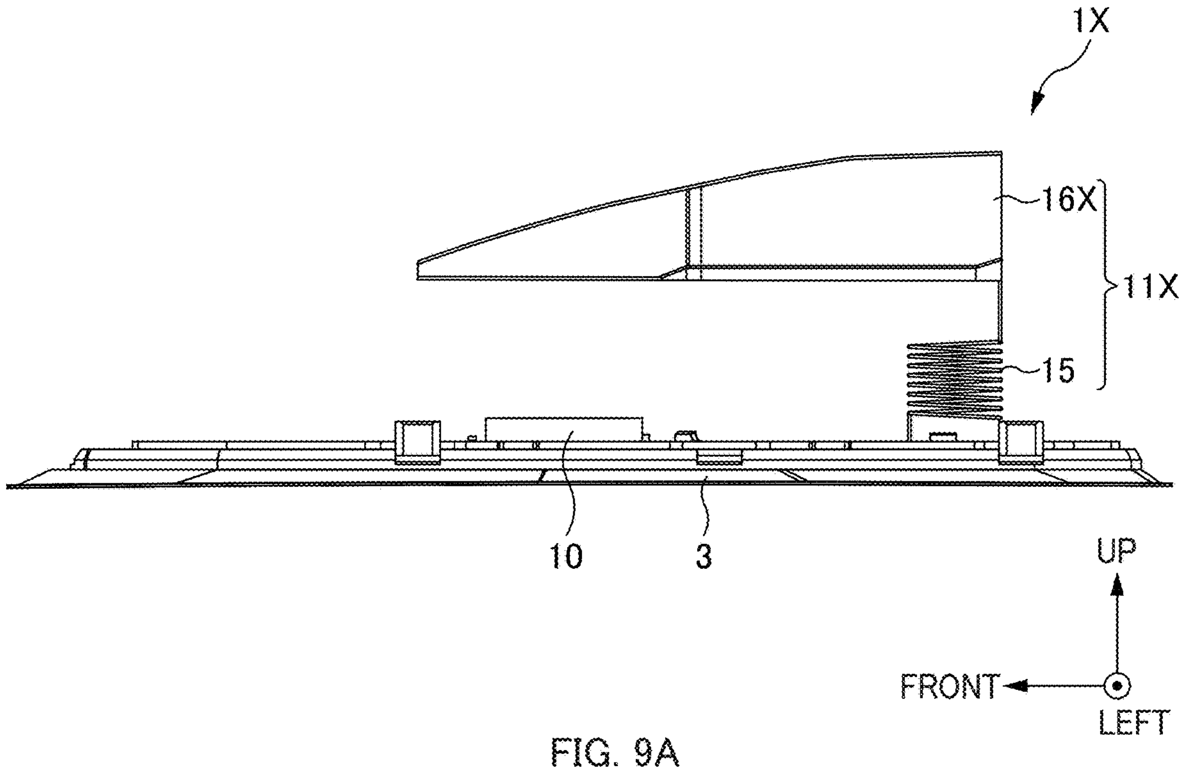
FIGS. 9A and 9B are views illustrating an antenna device 1X in Comparative Example.
Figure 9B:
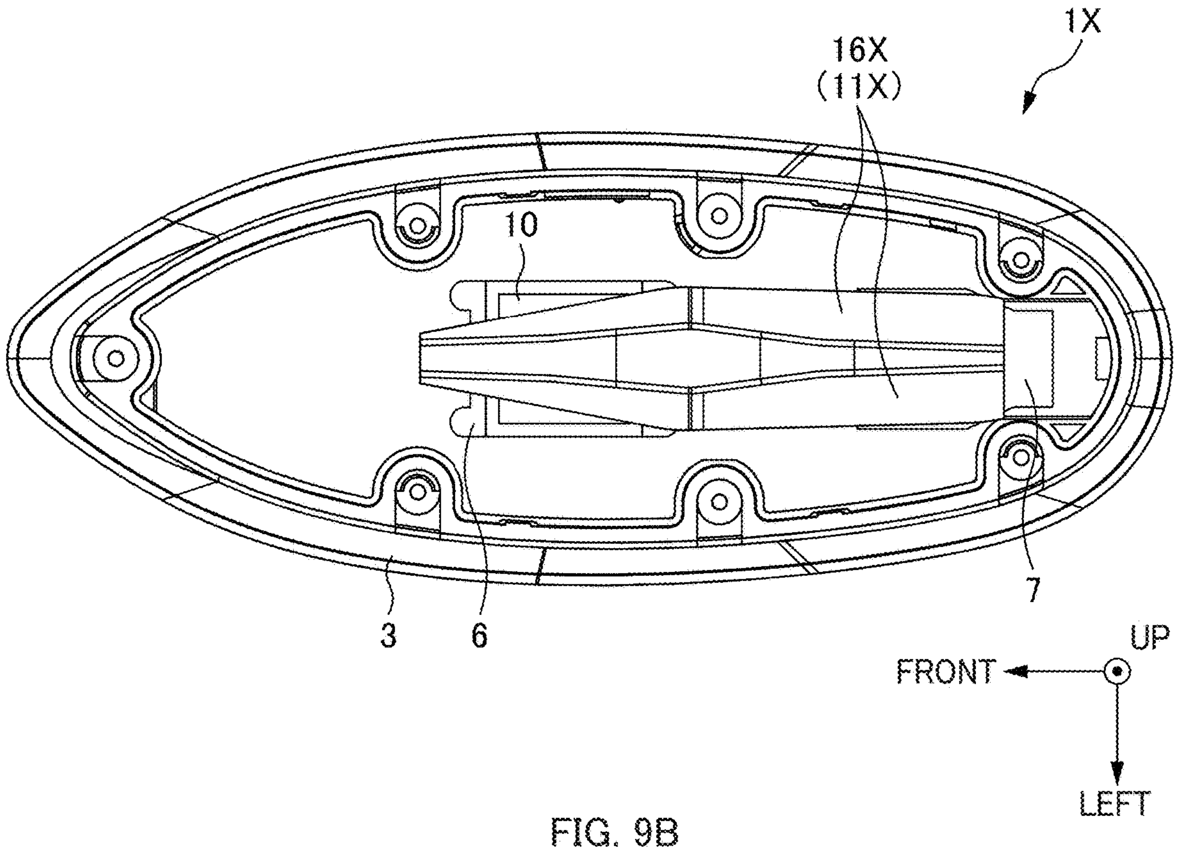

FIGS. 9A and 9B are views illustrating an antenna device 1X in Comparative Example: FIG. 9A is a side view of the antenna device 1X; and FIG. 9B is a plan view of the antenna device 1X.

The element 16 of the antenna 11 in an embodiment of the present disclosure described above includes the assemblies 17 and 18 each including the multiple parallel resonators 20 as illustrated in FIGS. 5A and 5B. An element 16X of an antenna 11X in Comparative Example is configured with a single metal body as illustrated in FIGS. 9A and 9B. Specifically, the element 16X in Comparative Example has a shape in which right and left metal body portions are connected to each other with an upper (top) metal body portion, and has such a shape as to be obtained by folding a single metal plate. Accordingly, in the element 16X in Comparative Example, the element 16 is not configured with the multiple parallel resonators 20 and the external connecting portions 50 as in the antenna 11 in an embodiment of the present disclosure.

Except for the configuration of the element 16X, the configuration of the antenna device 1X in Comparative Example is the same as or similar to the configuration of the antenna device 1 in an embodiment of the present disclosure. In other words, the antenna 11X is configured such that the element 16X and the element 15 resonate in the frequency band of radio waves for AM/FM radio. In addition, the antenna 10 and the antenna 11X are located such that at least part of the first area A1 of the antenna 10 overlaps with at least part of the second area A2 of the antenna 11X.

<<Comparison of Characteristics of Antennas 10 Between Antenna Device 1 and Antenna Device 1X>>

Figure 10:
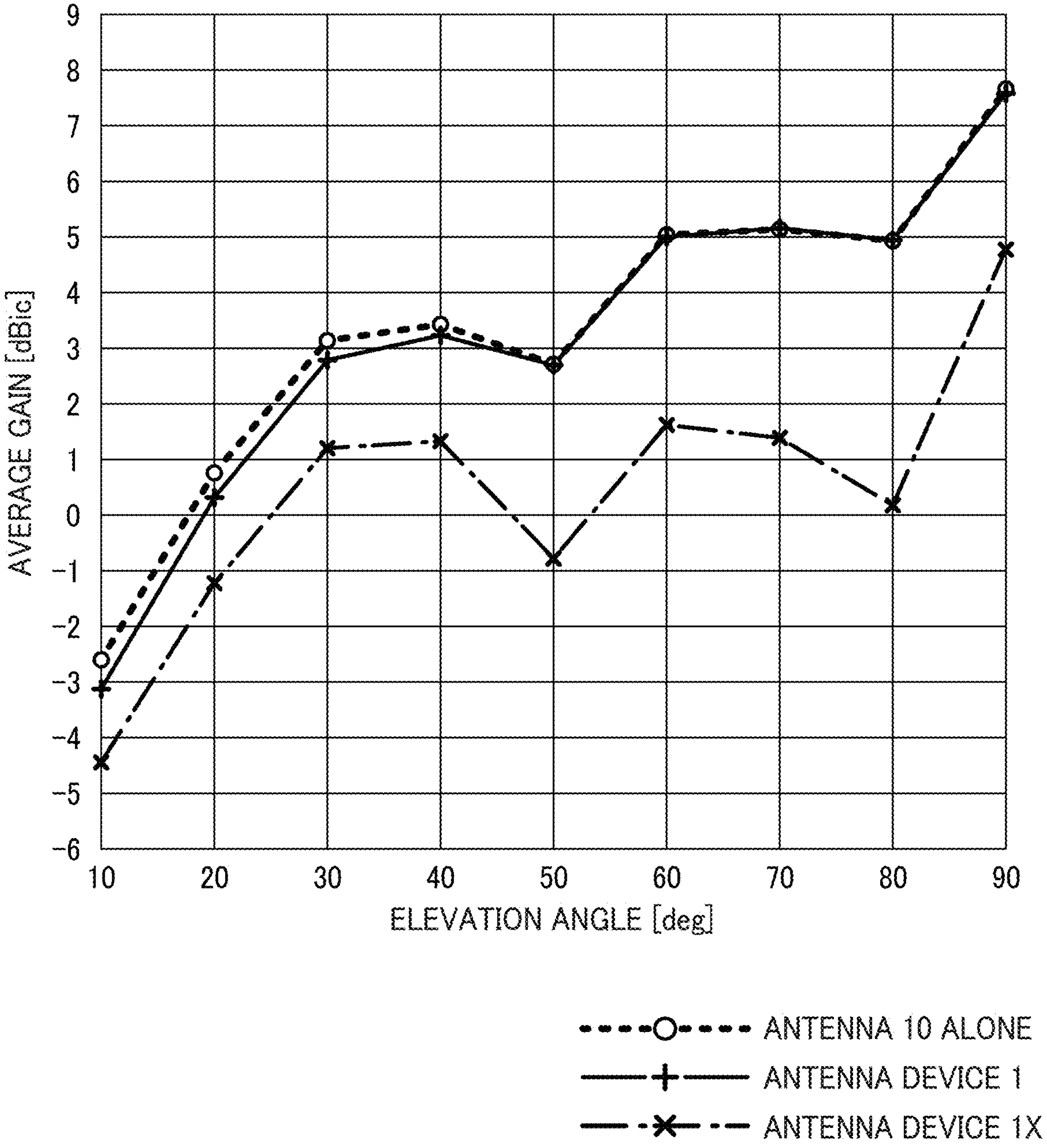
FIG. 10 is a diagram illustrating a relationship between an elevation angle and an average gain of an antenna 10 in each of an antenna device 1 in a first embodiment and an antenna device 1X in Comparative Example.

FIG. 10 is a diagram illustrating a relationship between an elevation angle and an average gain of the antenna 10 in each of the antenna device 1 in the first embodiment and the antenna device 1X in Comparative Example.

In FIG. 10, a horizontal axis represents an elevation angle and a vertical axis represents an average gain. In FIG. 10, a dashed-dotted line and × signs indicate calculation results of the antenna 10 of the antenna device 1X in Comparative Example and a solid line and + signs indicate calculation results of the antenna 10 of the antenna device 1 in an embodiment of the present disclosure. In addition, for comparison, a broken line and o signs indicate calculation results of a configuration including the antenna 10 alone (the configuration obtained by removing the antenna 11 from the antenna device 1 in an embodiment of the present disclosure).

As illustrated in FIG. 10, when the calculation results of the antenna 10 of the antenna device 1 in an embodiment of the present disclosure is compared with the calculation results of the antenna 10 of the antenna device 1X in Comparative Example, the average gain is significantly improved at each elevation angle. In addition, when the calculation results of the antenna 10 in the antenna device 1 in an embodiment of the present disclosure is compared with the calculation results in the configuration including the antenna 10 alone, a reduction in the average gain at each elevation angle is considerably small. Accordingly, the antenna 11 in the antenna device 1 in an embodiment of the present disclosure can suppress the influence on the characteristics of the antenna 10.

<<Modifications of Cross-Sectional Shape of Element 16>>

Next, with reference to FIGS. 11A to 11C, modifications of the cross-sectional shape of the element 16 will be described.

Figure 11A:
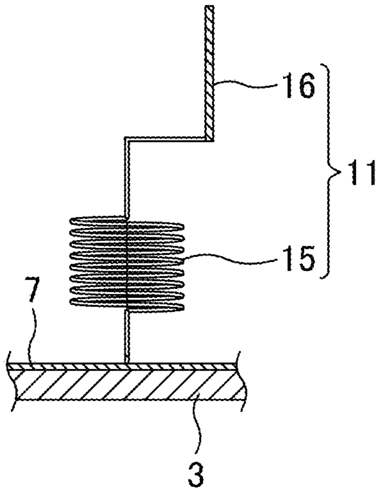
FIGS. 11A to 11C are views illustrating modifications of a cross-sectional shape of an element 16.
Figure 11B:
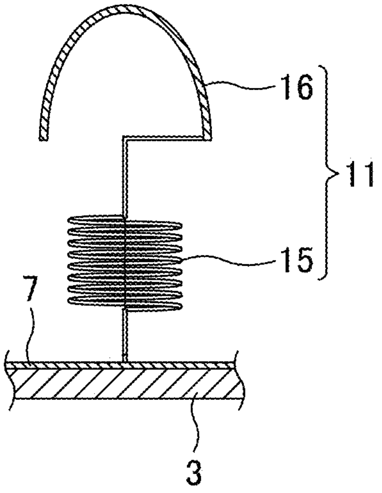
Figure 11B:
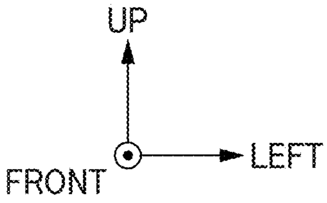
Figure 11C:
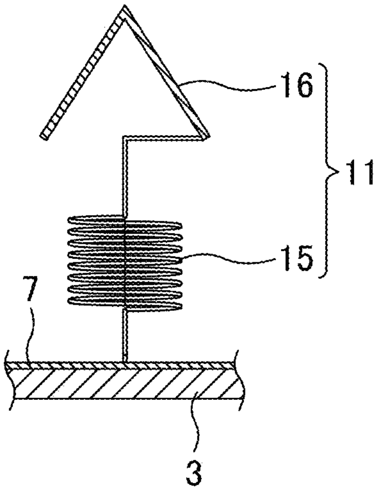

FIGS. 11A to 11C are views illustrating the modifications of the cross-sectional shape of the element 16: FIG. 11A is an explanatory view illustrating a first modification of the cross-sectional shape of the element 16; FIG. 11B is an explanatory view illustrating a second modification of the cross-sectional shape of the element 16; and FIG. 11C is an explanatory view illustrating a third modification of the cross-sectional shape of the element 16. FIGS. 11A to 11C are the cross-sectional views of the elements 16 taken along a plane perpendicular to the front-rear direction.

<First Modification of Cross-Sectional Shape of Element 16>

The cross-sectional shape of the element 16 in the first modification is an I shape as illustrated in FIG. 11A. In other words, the element 16 has a flat-plate shape perpendicular to the left-right direction. However, the flat-plate-shaped element 16 may have a shape obtained by being inclined at a predetermined angle in at least one of the up-down direction or the left-right direction.

Further, the element 16 may have a flat-plate shape perpendicular to the up-down direction. In this case, the cross-sectional shape of the element 16 is a shape of a minus sign. Even when the cross-sectional shape of the element 16 is formed as such, the element 16 can appropriately resonate, with the element 15, in the frequency band of radio waves for AM/FM radio. The element 16 in the first modification can also suppress the influence on the characteristics of the antenna 10.

<Second Modification of Cross-Sectional Shape of Element 16>

The cross-sectional shape of the element 16 in the second modification is an inverted U shape that is convex upward as illustrated in FIG. 11B. However, the element 16 may have a U shape that is convex downward. Even when the cross-sectional shape of the element 16 is formed as such, the element 16 can appropriately resonate, with the element 15, in the frequency band of radio waves for AM/FM radio. The element 16 in the second modification can also suppress the influence on the characteristics of the antenna 10.

<Third Modification of Cross-Sectional Shape of Element 16>

The cross-sectional shape of the element 16 in the third modification is an inverted V shape protruding upward as illustrated in FIG. 11C. However, the element 16 may have a V shape protruding downward. Even when the cross-sectional shape of the element 16 is formed as such, the element 16 can appropriately resonate, with the element 15, in the frequency band of radio waves for AM/FM radio. The element 16 in the third modification can also suppress the influence on the characteristics of the antenna 10.

In the element 16 in the inverted U shape illustrated in FIG. 11B and/or the element 16 in the inverted V shape illustrated in FIG. 11C, an upper portion (top portion) of the element 16 may have a flat-plate shape although not illustrated. Specifically, the cross-sectional shape of the element 16 is a shape obtained by the sides of a trapezoid excluding the base.

<Combination of First to Third Modifications of Cross-Sectional Shape of Element 16>

Each of the first to third modifications of the cross-sectional shape of the element 16 is described above. The first to third modifications of the cross-sectional shape of the element 16 described above may be combined freely. Even when the first to third modifications of the cross-sectional shape of the element 16 are combined as such, the element 16 can appropriately resonate, with the element 15, in the frequency band of radio waves for AM/FM radio, and suppress the influence on the characteristics of the antenna 10.

<<Modifications of Connecting path of Parallel Resonators in Element 16>>

Next, with reference to FIGS. 12A to 12C, modifications of the connecting path of the parallel resonators in the element 16 will be described. In the modifications of the connecting path of the parallel resonators in the element 16, which will be described below, the connecting path of the parallel resonators in the element 16 can be modified by changing the connections each between the parallel resonators immediately adjacent to each other (i.e., changing the positions of the external connecting portions 50).

As described above, the element 16 is the element configured to resonate, with the element 15, in the frequency band of radio waves for AM/FM radio, and functions as the capacitive loading element in the antenna 11. As long as the element 16 can function as the capacitive loading element for the frequency band of radio waves for AM/FM radio, any connecting paths of the parallel resonators can be used. In other words, the external connecting portions 50 may be arranged at any positions with respect to the multiple parallel resonators 20. Accordingly, the following modifications are specific examples of the connecting path of the parallel resonators, and connecting paths of parallel resonators other than the following modifications may be configured.

Figure 12A:
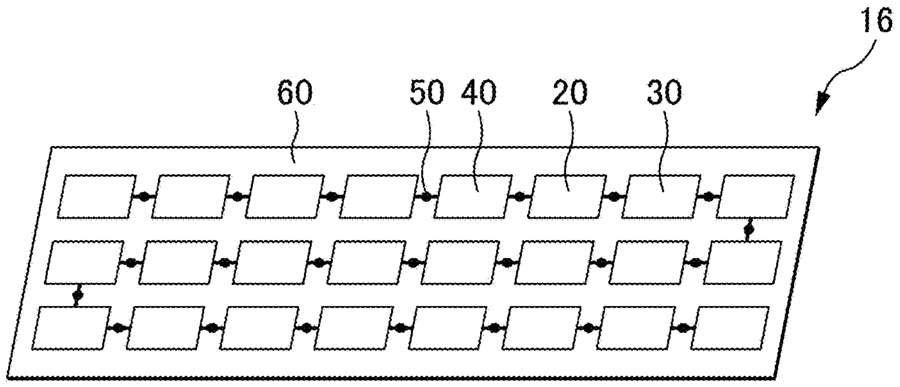
FIGS. 12A to 12C are views illustrating modifications of a connecting path of parallel resonators in an element 16.
Figure 12B:
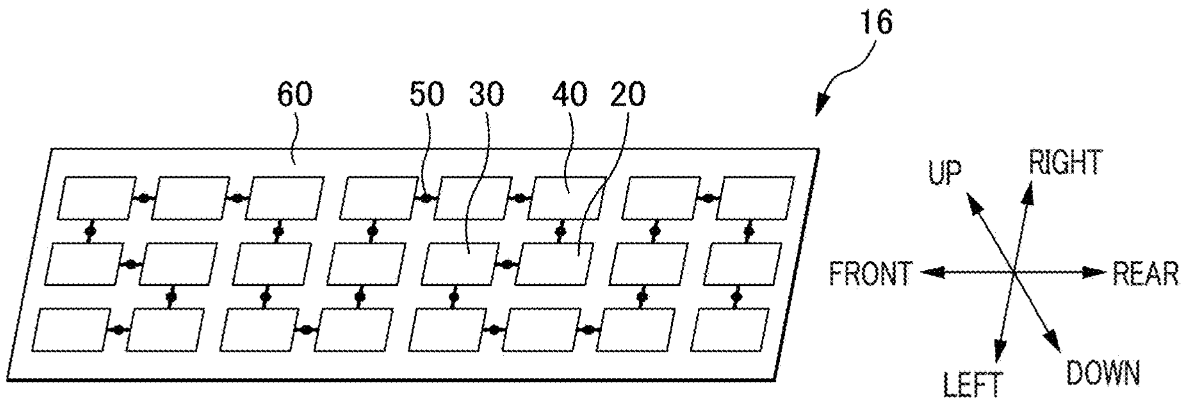
Figure 12C:
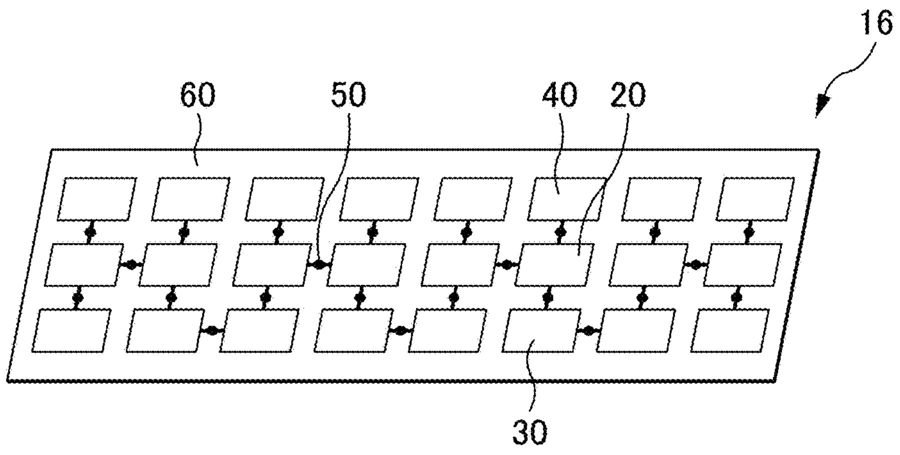

FIGS. 12A to 12C are views illustrating the modifications of the connecting path of the parallel resonators in the element 16: FIG. 12A illustrates a first modification of the connecting path of the parallel resonators in the element 16; FIG. 12B illustrates a second modification of the connecting path of the parallel resonators in the element 16; and FIG. 12C illustrates a third modification of the connecting path of the parallel resonators in the element 16.

<First Modification of Connecting Path of Parallel Resonators in Element 16>

The connecting path of the parallel resonators in the element 16 in the first modification is a meandering path while repeatedly turning in the front-rear direction (laterally meandering path) as illustrated in FIG. 12A. Even when the connecting path of the parallel resonators in the element 16 is configured as such, the element 16 can appropriately resonate, with the element 15, in the frequency band of radio waves for AM/FM radio. In addition, the influence on the characteristics of the antenna 10 can be suppressed. Moreover, the degree of freedom of design can be improved.

<Second Modification of Connecting Path of Parallel Resonators in Element 16>

The connecting path of the parallel resonators in the element 16 in the second modification is a meandering path while repeatedly turning in the front-rear direction and the left-right direction irregularly as illustrated in FIG. 12B. Even when the connecting path of the parallel resonators in the element 16 is configured as such, the element 16 can appropriately resonate, with the element 15, in the frequency band of radio waves for AM/FM radio. In addition, the influence on the characteristics of the antenna 10 can be suppressed. Moreover, the degree of freedom of design can be improved.

<Third Modification of Connecting Path of Parallel Resonators in Element 16>

In the first and second modifications, the connecting path of the parallel resonators in the element 16 is configured so as to pass all the illustrated parallel resonators 20 as in a single stroke. However, in the third modification, the parallel resonators 20 in two rows on the left side are connected to a connecting path that meanders while repeating turning in the left-right direction, and the parallel resonators 20 in one row on the right side are respectively connected to connecting paths branched from the aforementioned meandering connecting path. Even when the connecting path of the parallel resonators in the element 16 is configured as such, the element 16 can appropriately resonate, with the element 15, in the frequency band of radio waves for AM/FM radio. In addition, the influence on the characteristics of the antenna 10 can be suppressed. Moreover, the degree of freedom of design can be improved.

<Combination of First to Third Modifications of Connecting Path of Parallel Resonators in Element 16>

Although each of the first to third modifications of the connecting path of the parallel resonators in the element 16 is described above, the first to third modifications described above can be combined freely.

For example, the parallel resonators 20 may be divided into blocks each including multiple, such as two or four, parallel resonators, and a connecting path may be changed in each of the blocks. Further, the connecting path may be a path that does not meander. For example, the connecting path may be configured to circulate, spiral, or extend linearly.

<<Modifications of Parallel Resonator 20>>

Next, with reference to FIGS. 13 to 18D, the modifications of the parallel resonator 20 will be described.

<First Modification of Parallel Resonator 20>

Figure 13:
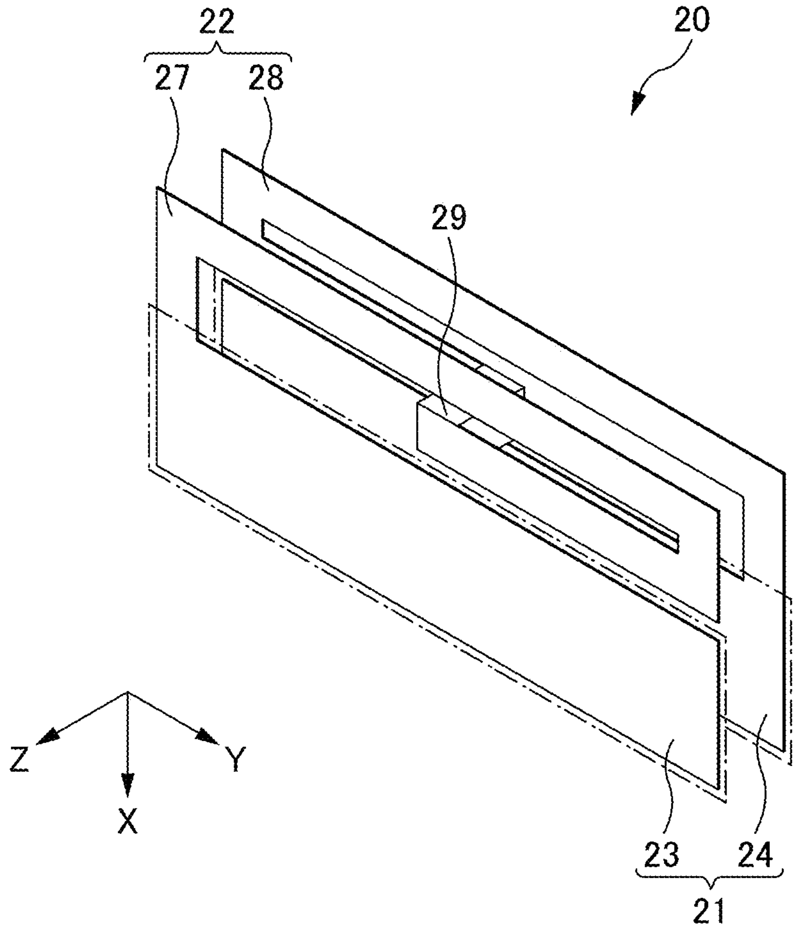
FIG. 13 is a perspective view of a parallel resonator 20 in a first modification.

FIG. 13 is a perspective view of a first modification of the parallel resonator 20. FIGS. 14A to 14F are six face views of the first modification of the parallel resonator 20.

Figures 14A, 14B, 14C, 14D, 14E, 14F:
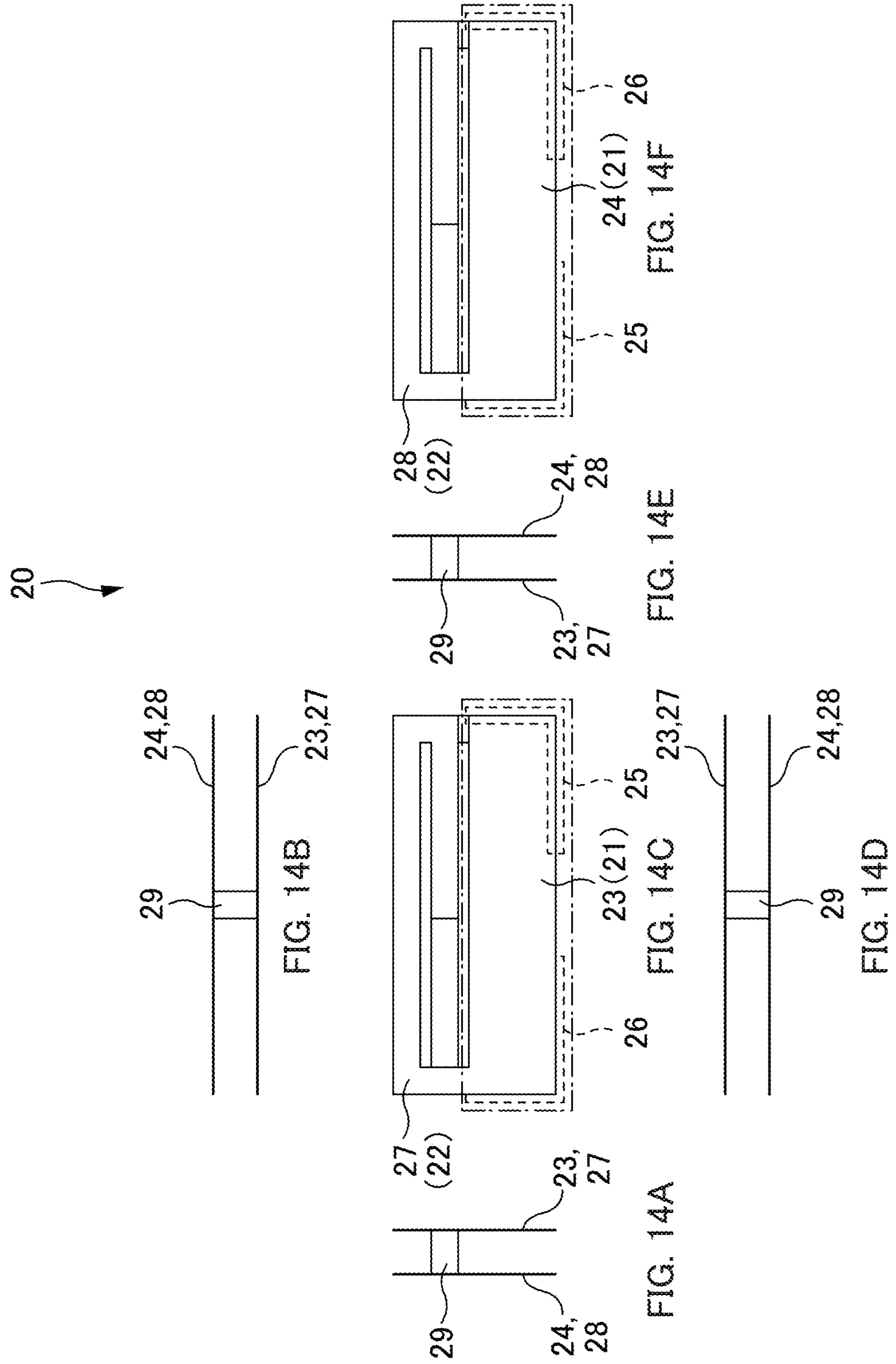
FIGS. 14A to 14F are six face views of a parallel resonator 20 in a first modification.

In FIGS. 14A to 14F, assuming that the view of the parallel resonator 20 in the first modification when seen in the −Z direction is a front view, FIG. 14A is a left side view, FIG. 14B is a top view, FIG. 14C is the front view, FIG. 14D is a bottom view, FIG. 14E is a right-side view, and FIG. 14F is a back view.

The outer shape of the parallel resonator 20 illustrated in FIGS. 6A and 6B and 7A to 7F described above is the substantially-square shape in the plan view. However, the outer shape of the parallel resonator 20 in the first modification is a substantially-rectangular shape in the plan view as illustrated in FIGS. 13 and 14A to 14F. More specifically, the outer shape is a substantially-rectangular shape having a length in the Y direction longer than that in the X direction. However, the outer shape of the parallel resonator 20 in the first modification may be a substantially-rectangular shape having a length in the X direction longer than that in the Y direction.

With the outer shape of the parallel resonator 20 being formed into a substantially-rectangular shape, the shape of the element 16 configured with multiple parallel resonators 20 can be flexibly formed. For example, a substantially-rectangular parallel resonator 20 can be arranged even in an end region of the element 16 that is too narrow to arrange a substantially-square parallel resonator 20. Thus, for example, as in the parallel resonators 20 located in an upper portion of the element 16 in FIG. 5A, the parallel resonators 20 can be arranged in the element 16 without wasting a space, thereby being able to increase the capacity of the element 16. The element 16 may be formed such that only substantially-rectangular parallel resonators 20 are arranged or substantially-square and rectangular parallel resonators 20 are arranged in combination.

<Second Modification of Parallel Resonator 20>

Figure 15:
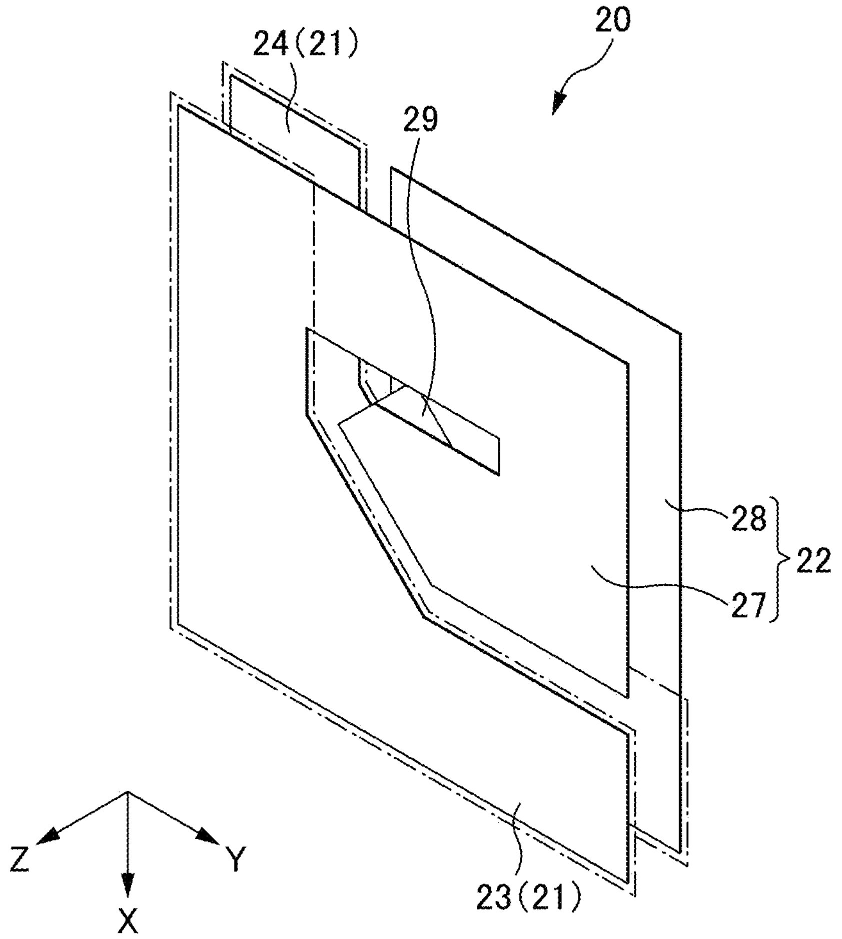
FIG. 15 is a perspective view of a parallel resonator 20 in a second modification.

FIG. 15 is a perspective view of a second modification of the parallel resonator 20. FIGS. 16A to 16F are six face views of the second modification of the parallel resonator 20.

Figures 16A, 16B, 16C, 16D, 16E, 16F:
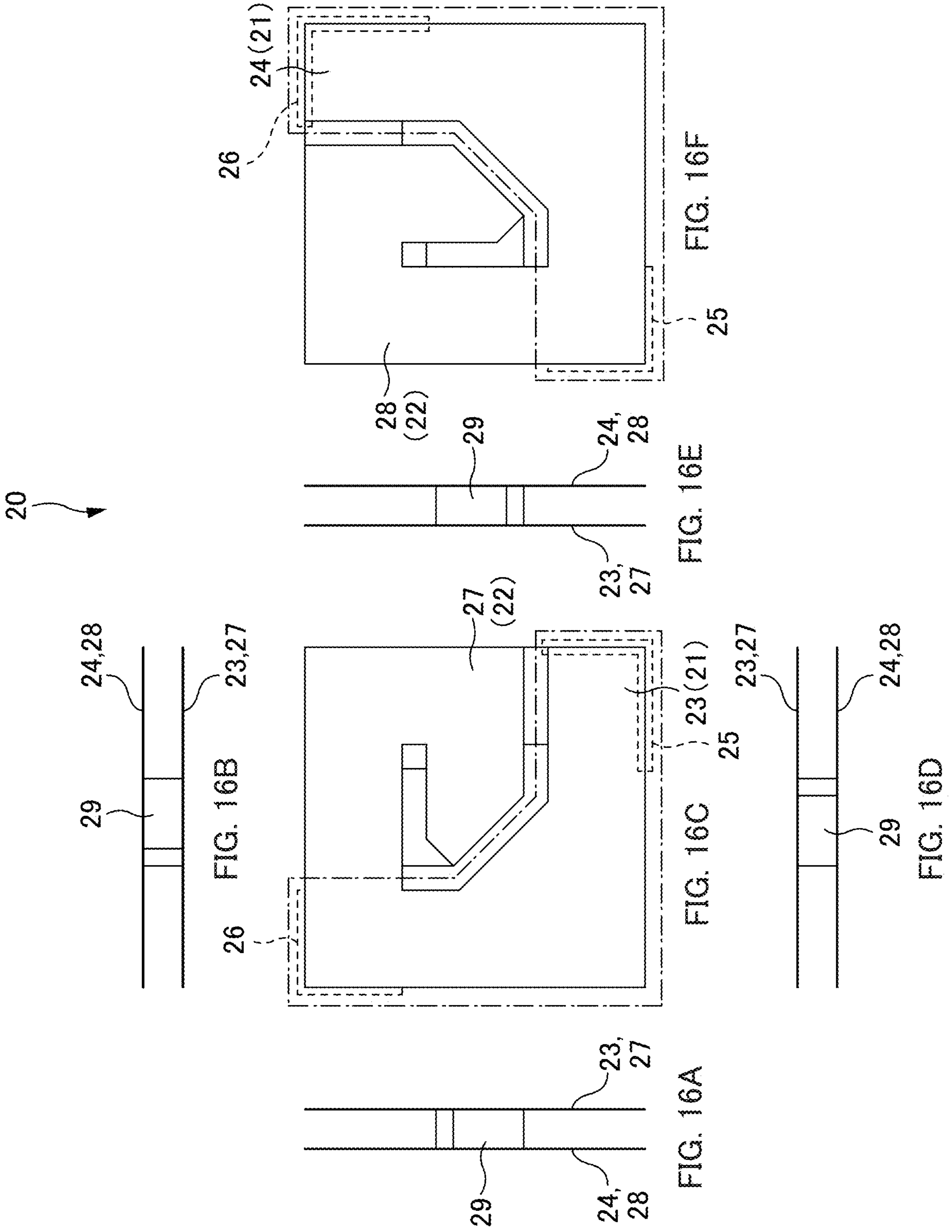
FIGS. 16A to 16F are six face views of a parallel resonator 20 in a second modification.

In FIGS. 16A to 16F, assuming that the view of the parallel resonator 20 in the second modification when seen in the −Z direction is a front view, FIG. 16A is a left side view, FIG. 16B is a top view, FIG. 16C is the front view, FIG. 16D is a bottom view, FIG. 16E is a right-side view, and FIG. 16F is a back view.

The connecting region 25 and the connecting region 26 in the parallel resonator 20 illustrated in FIGS. 6A and 6B and 7A to 7F described above are arranged in the Y axis direction as illustrated in FIG. 6B. However, as illustrated in FIG. 16, the connecting region 25 and the connecting region 26 of the parallel resonator 20 in the second modification are located diagonally. In other words, when seen in a three-dimensional structure, the connecting region 25 and the connecting region 26 are located at positions farthest from each other.

With the connecting region 25 and the connecting region 26 of the parallel resonator 20 being located diagonally, the position of the parallel resonator 30 immediately adjacent (or the parallel resonator 40 immediately adjacent) to the parallel resonator 20 can be flexibly set. This can improve the degree of freedom of design. Moreover, the element 16 may be formed such that only the parallel resonators 20 in the second modification are arranged, the parallel resonators 20 illustrated in FIGS. 6A and 6B and 7A to 7F and the parallel resonators 20 in the second modification are arranged in combination, or the parallel resonators 20 in the first and second modifications are arranged in combination.

<Third Modification of Parallel Resonator 20>

Figure 17:
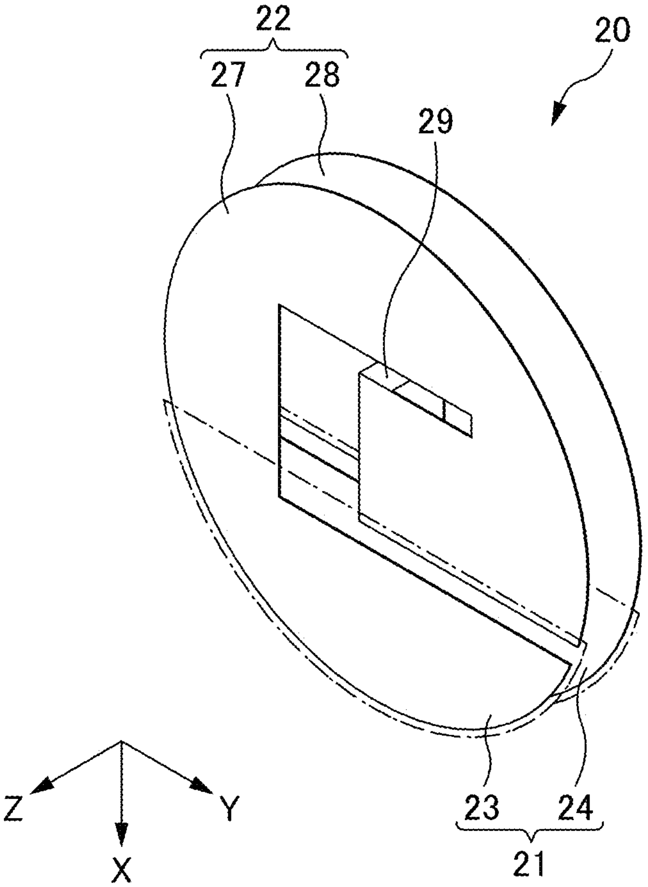
FIG. 17 is a perspective view of a parallel resonator 20 in a third modification.

FIG. 17 is a perspective view of a third modification of the parallel resonator 20. FIGS. 18A to 18F are six face views of the third modification of the parallel resonator 20.

Figures 18A, 18B, 18C, 18D, 18E, 18F:
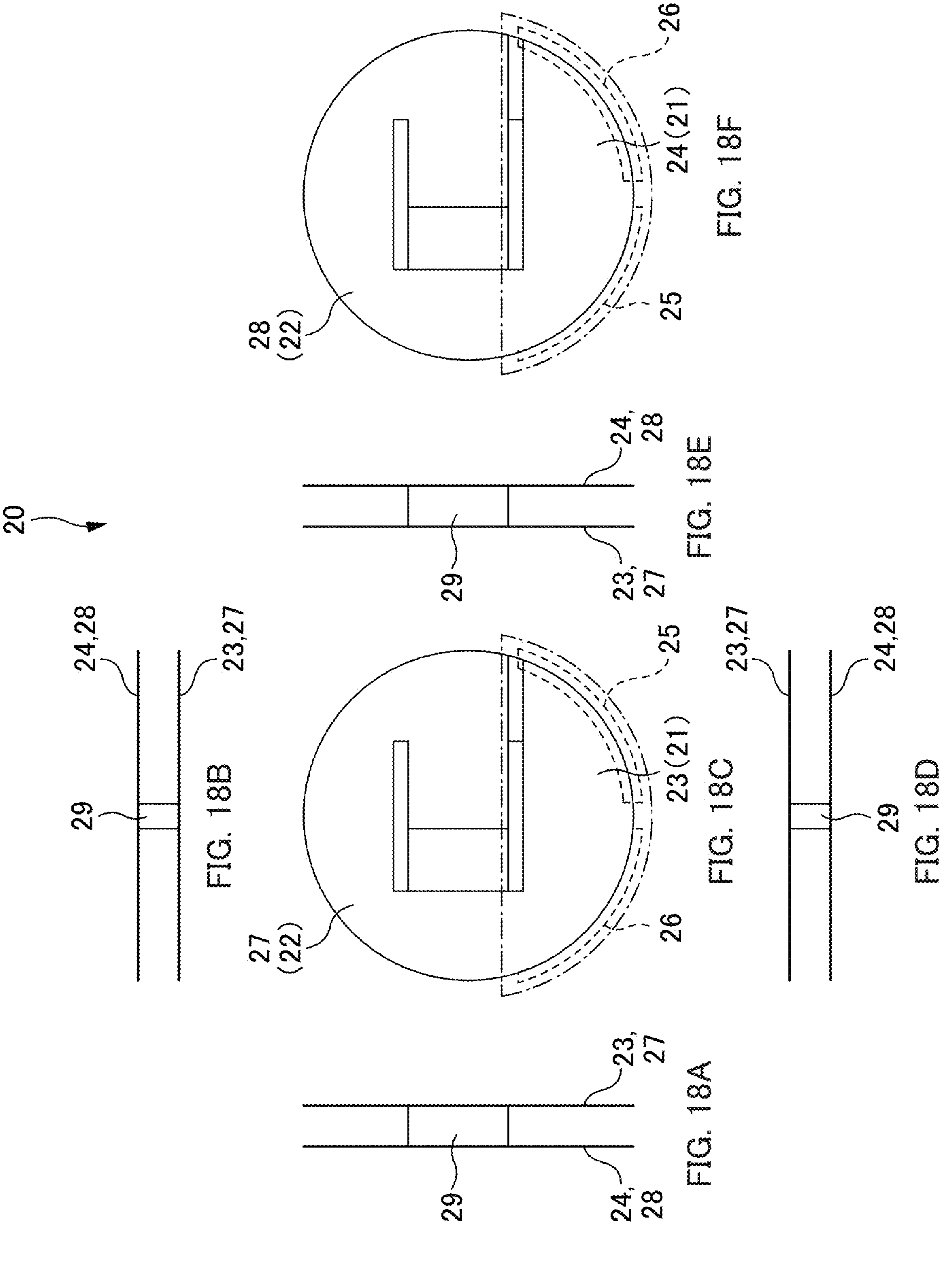
FIGS. 18A to 18F are six face views of a parallel resonator 20 in a third modification.

In FIGS. 18A to 18F, assuming that the view of the parallel resonator 20 in the third modification when seen in the −Z direction is a front view, FIG. 18A is a left side view, FIG. 18B is a top view, FIG. 18C is the front view, FIG. 18D is a bottom view, FIG. 18E is a right-side view, and FIG. 18F is a back view.

As illustrated in FIGS. 17 and 18A to 18F, the outer shape of the third modification of the parallel resonator 20 is a substantially-circular shape in the plan view. However, the outer shape of the parallel resonator 20 in the third modification may be an elliptical shape or a semi-circular shape. The connecting region 25 and the connecting region 26 of the parallel resonator 20 in the third modification are arranged in the Y axis direction. Moreover, the element 16 may be formed such that only the parallel resonators 20 in the third modification may be arranged, the parallel resonators 20 illustrated in FIGS. 6A and 6B and 7A to 7F and the parallel resonators 20 in the third modification may be arranged in combination, or the parallel resonators 20 in the second and third modifications may be arranged in combination.

<Combination of First to Third Modifications of Parallel Resonator 20>

Although each of the first to third modifications of the parallel resonator 20 is described above, at least two types of the parallel resonators 20 in the above-described first to third modifications and the parallel resonators 20 illustrated in FIGS. 6A and 6B and 7A to 7D can be freely arranged in combination.

Second Embodiment

The antenna device 1 in the first embodiment is described above. In other words, the antenna 10 of the antenna device 1 in the first embodiment operates with radio waves in one frequency band (e.g., the 1.5 GHz band for GNSS). However, an antenna included in an antenna device may operate with radio waves in multiple frequency bands. Accordingly, the following describes an antenna device 1 in the second embodiment having an antenna 10A operating with radio waves in multiple frequency bands.

Figure 19A:
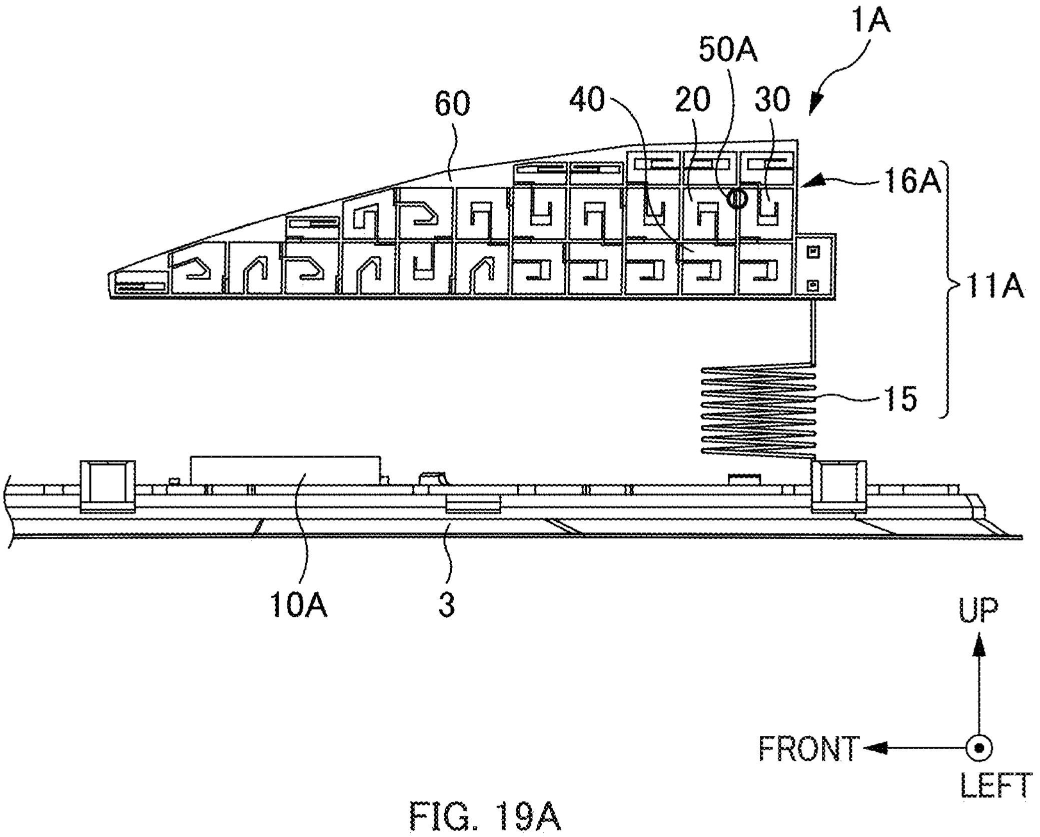
FIGS. 19A to 19C are views illustrating an antenna device 1A in a second embodiment.
Figure 19B:
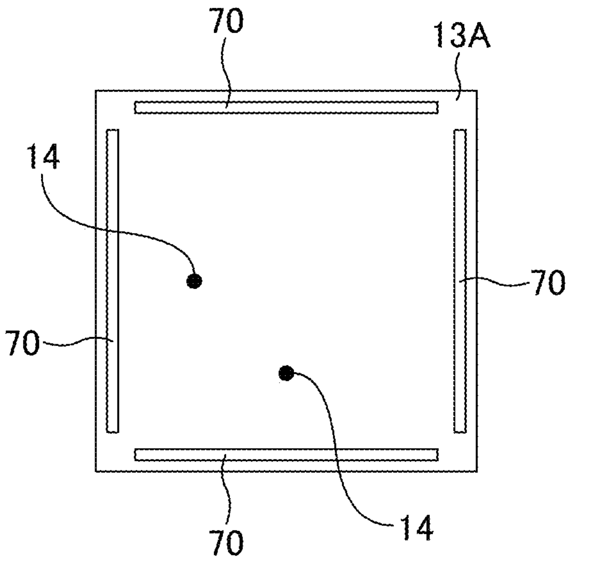
Figure 19C:
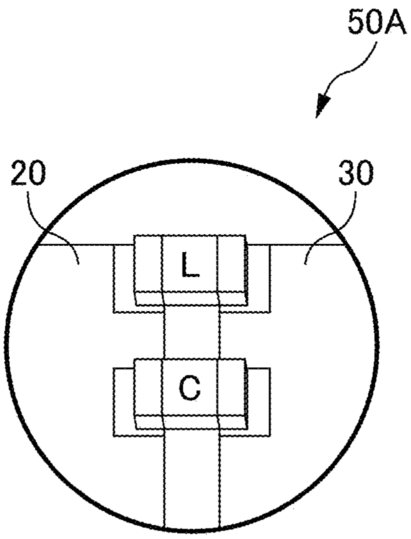

FIGS. 19A to 19C are views illustrating the antenna device 1A in the second embodiment: FIG. 19A is a side view of the antenna device 1A; and FIG. 19B is a plan view of a radiating element 13A in an antenna 10A. FIG. 19C is an enlarged view of an external connecting portion 50A.

As illustrated in FIG. 19B, the radiating element 13A in the antenna 10A has four slots 70 along the outer edges of the radiating element 13A. The slots 70 are openings (or holes) formed in the antenna 10A to radiate (or reflect) radio waves in a desired frequency band to be received by the antenna 10A. The frequency bands to be received by the antenna 10A including the radiating element 13A having the slots 70 include two frequency bands, one of which is a frequency band determined by the dimensions of the outer shape of the radiating element 13A and the other of which is a frequency band determined by the length of the slots 70 formed in the radiating element 13A.

The shape of the slots 70 illustrated in FIG. 19B is a substantially-rectangular shape, but is not limited thereto. The shape of the slots 70 may be a curved shape convex toward the center of the radiating element, a shape having at least one protrusion, or a wavy shape. In addition, the slots 70 illustrated in FIG. 19B are provided at four locations, but are not limited thereto. Multiple slots for the antenna 10A to operate with radio waves in another different frequency band may be further provided. Thus, the antenna 10A may be configured to operate with radio waves in three or more different frequency bands.

As a result, the antenna 10A can receive the radio waves in two frequency bands, which are the aforementioned L1 band and an L2 band, for example. In an embodiment of the present disclosure, the antenna 10A receives radio waves, for example, in a band of 1212 MHz to 1254 MHz for the L2 band in addition to the L1 band. A target frequency in the L2 band is the center frequency in an embodiment of the present disclosure, and the center frequency herein is 1227.6 MHz. The frequency bands of radio waves to be received by the antenna 10A including the radiating element 13A may not be limited to the L1 band and the L2 band, but may be two desired frequency bands, or three or more frequency bands. Further, the antenna including the radiating element 13A only has to perform at least one of transmission or reception of radio waves in multiple desired frequency bands.

In order for the antenna 10A to receive radio waves in multiple frequency bands, slits may be formed in the radiating element 13A instead of the slots 70. Although not illustrated, the slots 70 may include meandering portions. This increases the entire length of the slots 70 and the electrical length longer, as compared with the slots without the meandering portion illustrated in FIG. 19B. Accordingly, the slots 70 having the meandering portions can lower the resonance frequency determined depending on the radiating element 13A, thereby being able to improve the degree of freedom in setting of two frequency bands of radio waves to be received by the antenna 10A.

Moreover, in the case where the size of the antenna device LA in the up-down direction is not strictly limited, the antenna 10A may be a multi-layer or multi-stage antenna to receive radio waves in multiple desired frequency bands. For example, the element in the lower layer or lower stage of the antenna 10A may operate with radio waves in a desired frequency band, and the element in the upper layer or upper stage of the antenna 10A may operate with radio waves in a frequency band higher or lower than the desired frequency band. Provision of two or more elements to the antenna 10A as such makes it possible to configure the antenna 10A operating with radio waves in multiple frequency bands.

In the antenna device LA in an embodiment of the present disclosure, the element 16A of the antenna 11A includes external connecting portions 50A different from those in the first embodiment, as illustrated in FIGS. 19A and 19C. Other configuration of the antenna device LA is the same as or similar to that of the antenna device 1 in the first embodiment.

The external connecting portion 50A is configured with a lumped constant circuit. The external connecting portion 50A configured with the lumped constant circuit is a parallel resonance circuit including a capacitor portion C and an inductor portion L as illustrated in FIG. 19C. However, the external connecting portion 50A configured with the lumped constant circuit may be configured with only an inductor portion L, or with any combination of elements capable of configuring a parallel resonance circuit.

As illustrated in FIGS. 19A and 19C, one terminal of the external connecting portion 50A is connected to the parallel resonator 20, and the other terminal thereof is connected to the parallel resonator 30 immediately adjacent to the parallel resonator 20. In this way, the external connecting portion configured with the lumped constant circuit is provided so as to form a bridge between the immediately adjacent parallel resonators 20 and 30.

In the antenna 11A of the antenna device LA in an embodiment of the present disclosure, the parallel resonators 20 in the element 16A resonate in one frequency band (e.g., the L1 band) among the multiple frequency bands of radio waves in which the antenna 10A operates. Further, in the antenna 11A of the antenna device LA in an embodiment of the present disclosure, the external connecting portions 50A in the element 16A resonate in another frequency band (e.g., the L2 band) among the multiple frequency bands of radio waves in which the antenna 10A operates. This makes it possible to suppress the influence on the characteristics of the antenna 10A operating with the radio waves in the multiple frequency bands (herein, the L1 band and the L2 band).

Third Embodiment

<<Element 16B>>

In the antenna device LA in the second embodiment described above, the element 16A includes the external connecting portions 50A each configured with the lumped constant circuit, thereby making it possible to suppress the influence on the characteristics of the antenna 10A operating with the radio waves in the multiple frequency bands. However, a configuration different from that in the second embodiment also makes it possible to suppress the influence on the characteristics of an antenna operating with radio waves in multiple frequency bands. Thus, the following describes an antenna device 1B in a third embodiment including an antenna 10B operating with radio waves in multiple frequency bands.

Figure 20:
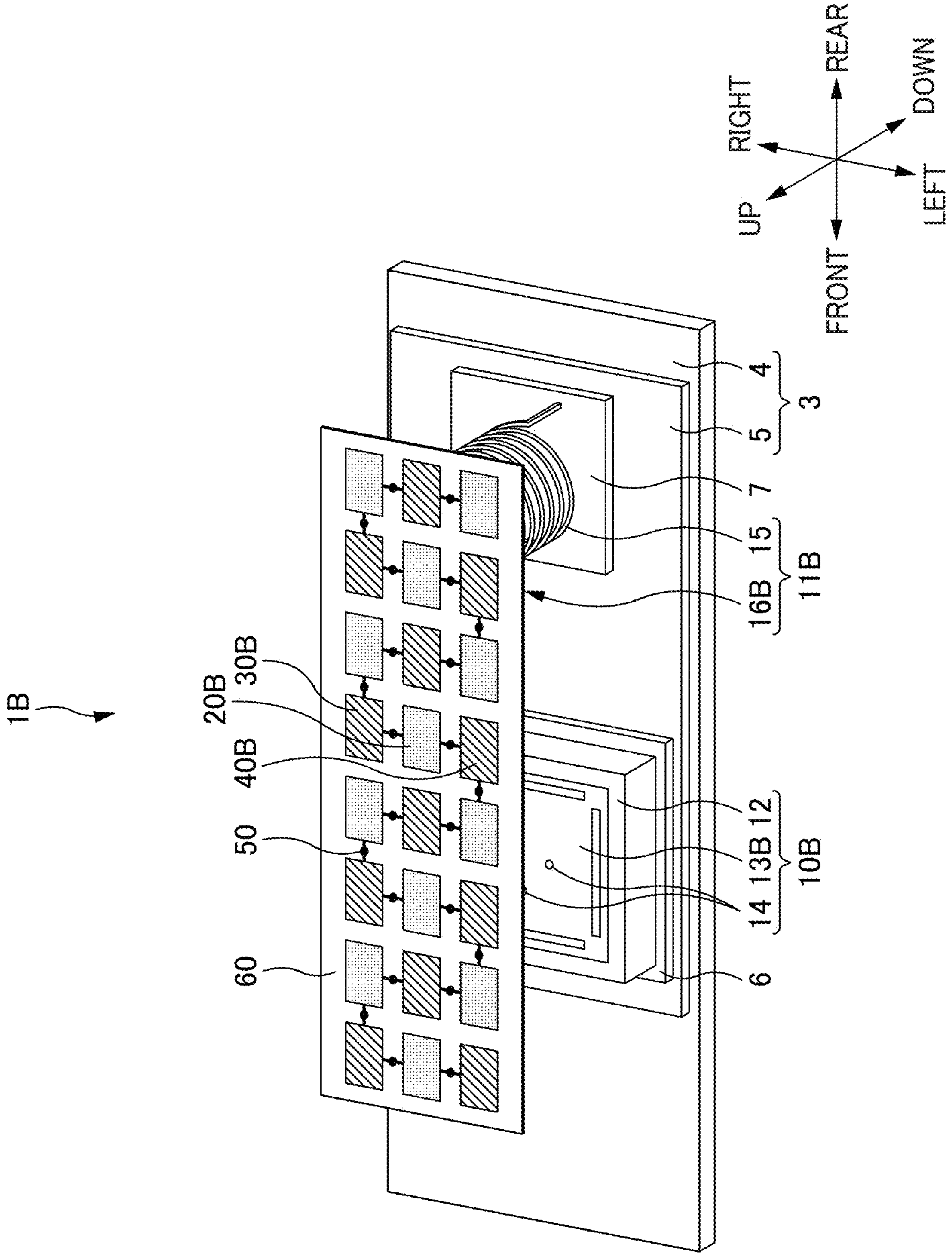
FIG. 20 is a view for explaining an overview of an antenna device 1B in a third embodiment.
Figure 21A:
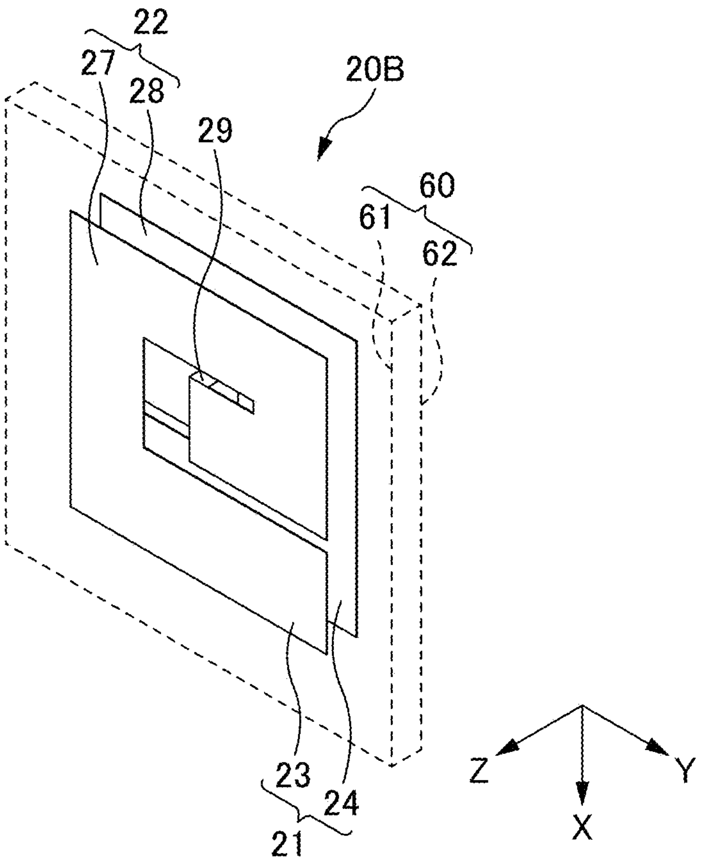
FIGS. 21A and 21B are views illustrating a parallel resonator 20B.
Figure 21B:
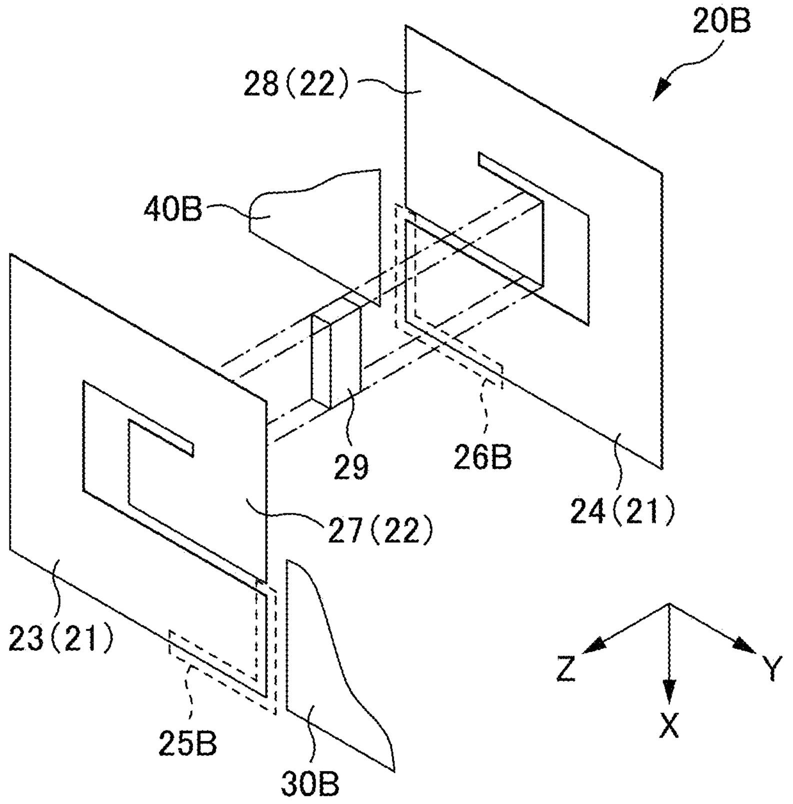
Figures 22A, 22B, 22C, 22D, 22E, 22F:
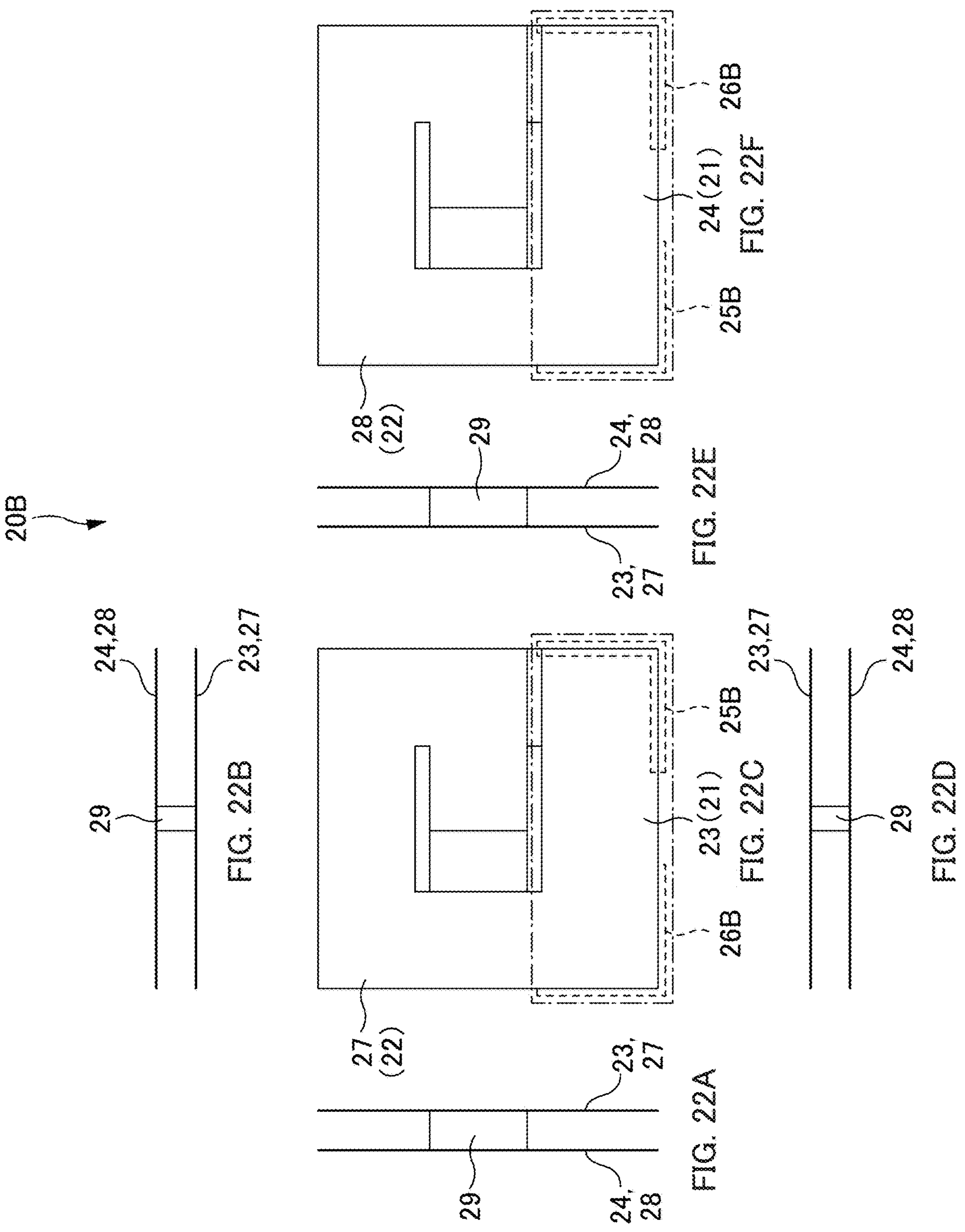
FIGS. 22A to 22F are six face views of a parallel resonator 20B.

FIG. 20 is a view for explaining an overview of the antenna device 1B in the third embodiment. FIGS. 21A and 21B are views illustrating a parallel resonator 20B: FIG. 21A is a perspective view of the parallel resonator 20B; and FIG. 21B is an exploded perspective view of the parallel resonator 20B. FIGS. 22A to 22F are six face views of the parallel resonator 20B.

FIG. 20 simply illustrates the antenna device 1B by schematically illustrating the antenna device 1B and constituents included in the antenna device 1B (e.g., an antenna 11B, which will be described later). The detailed shape and configuration of the antenna device 1B in an embodiment of the present disclosure are the same as or similar to those in the antenna device 1 in the first embodiment illustrated in FIGS. 4 and 5A and 5B except for those described below. In addition, to illustrate the inside of the antenna device 1B, illustration of the case 2 is omitted in FIG. 20.

The antenna device 1B in an embodiment of the present disclosure includes an antenna 10B operating with radio waves in multiple frequency bands such as the L1 band and the L2 band as in the antenna 10A in the second embodiment. Moreover, in the antenna device 1B in an embodiment of the present disclosure, the element 16B of the antenna 11B includes parallel resonators (e.g., parallel resonators 20B) configured to resonate in a frequency band of the L1 band, for example, and parallel resonators (e.g., parallel resonators 30B and parallel resonators 40B) configured to resonate in a frequency band of the L2 band, for example. In other words, the element 16B includes two types of parallel resonators with resonance frequencies different from each other. This makes it possible to suppress the influence on the characteristics of the antenna 10B operating with the radio waves in the multiple frequency bands (herein, the L1 band and the L2 band).

In the following description, of the two types of parallel resonators with the different resonance frequencies, the parallel resonators (in FIG. 20, the parallel resonators 20B) configured to resonate in one frequency band may be referred to as “parallel resonators for A frequency band”. FIG. 20 illustrates the parallel resonators for A frequency band by hatching with dots. Meanwhile, of the two types of parallel resonators with the different resonance frequencies, the parallel resonators (in FIG. 20, the parallel resonators 30B and 40B) configured to resonate in another frequency band may be referred to as “parallel resonators for B frequency band”. FIG. 20 illustrates the parallel resonators for B frequency band by hatching with oblique lines.

FIGS. 21A and 21B and 22A to 22F illustrate a detailed configuration of the parallel resonator 20B which is the parallel resonator for A frequency band. The configuration of the parallel resonator 20B which is the parallel resonator for A frequency band is the same as or similar to the configuration of the parallel resonator 20 in the first embodiment illustrated in FIGS. 6A and 6B and 7A to 7F except that the parallel resonators 30B and 40B immediately adjacent thereto are the parallel resonators for B frequency band that is different from the A frequency band.

In the element 16B in an embodiment of the present disclosure, the parallel resonators for A frequency band and the parallel resonators for B frequency band are alternately arranged one by one as illustrated in FIG. 20. Further, in the element 16B in an embodiment of the present disclosure, the parallel resonators for A frequency band and the parallel resonators for B frequency band are arranged in a base member 60 having a single-layer structure. However, it is not limited thereto, and may operate with three frequency bands by arranging the parallel resonators 20B operating with the radio waves in the A frequency band, the parallel resonators 30B operating with the radio waves in the B frequency band, and the parallel resonators 40B operating with radio waves in a C frequency band different from both of the A and B frequency bands, for example. Moreover, an aspect of the arrangement of the parallel resonators 20B is not limited to these cases. Thus, the following describes modifications of the arrangement of the parallel resonators 20B.

<<Modifications of Arrangement of Parallel Resonators 20B>>

<First Modification of Arrangement of Parallel Resonators 20B>

Figure 23:
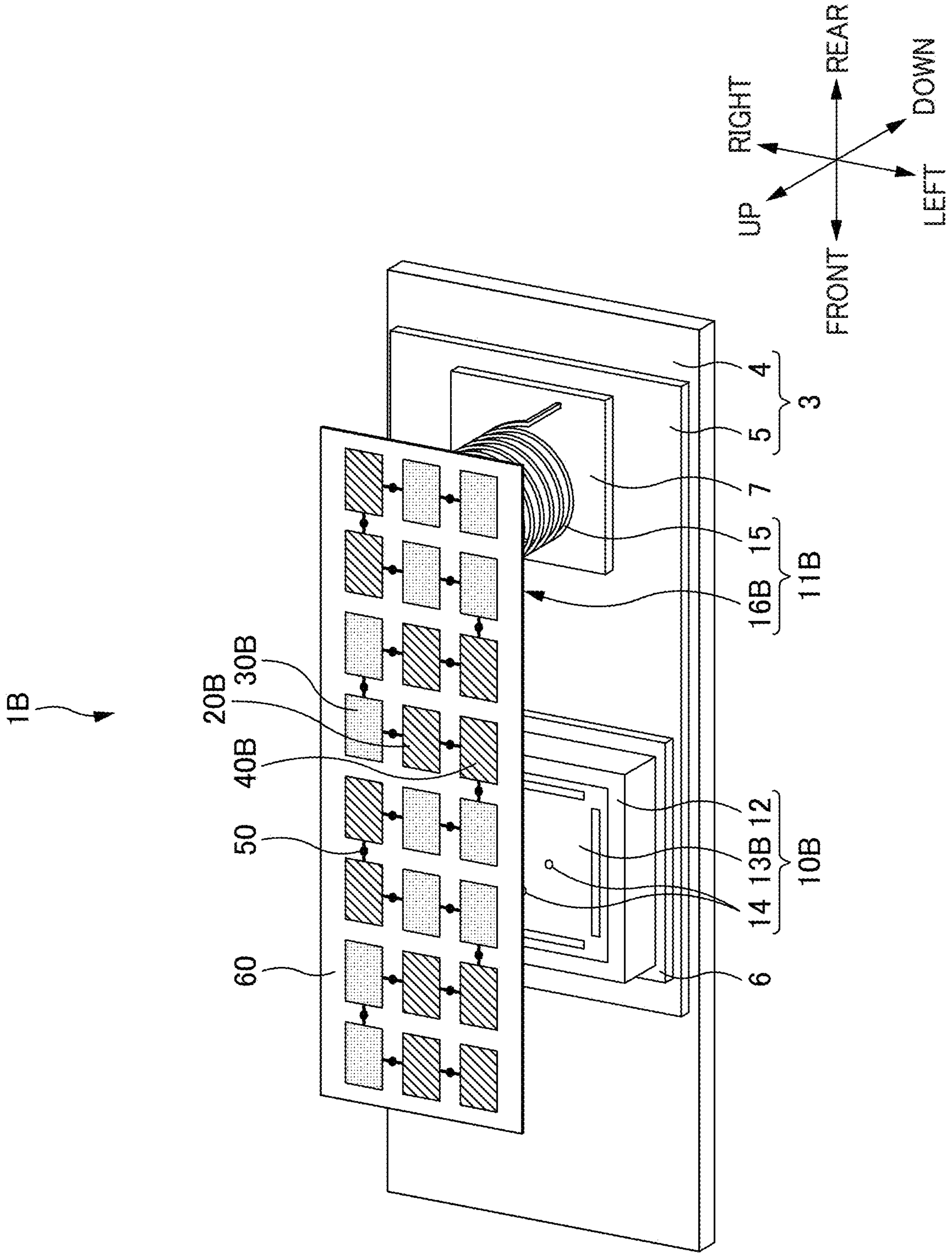
FIG. 23 is an explanatory view illustrating a first modification of arrangement of parallel resonators 20B.

FIG. 23 is an explanatory view of a first modification of the arrangement of the parallel resonators 20B.

In the element 16B in the first modification illustrated in FIG. 23, the parallel resonators for A frequency band and the parallel resonators for B frequency band are alternately arranged two by two. Such an arrangement also makes it possible to suppress the influence on the characteristics of the antenna 10B operating with the radio waves in the multiple frequency bands (herein, the L1 band and the L2 band).

However, in the element 16B, a given number of the parallel resonators for A frequency band and the given number of the parallel resonators for B frequency band may be alternately arranged. Further, in the element 16B, the parallel resonators for A frequency band and the parallel resonators for B frequency band may be irregularly arranged.

<Second Modification of Arrangement of Parallel Resonators 20B>

Figure 24A:
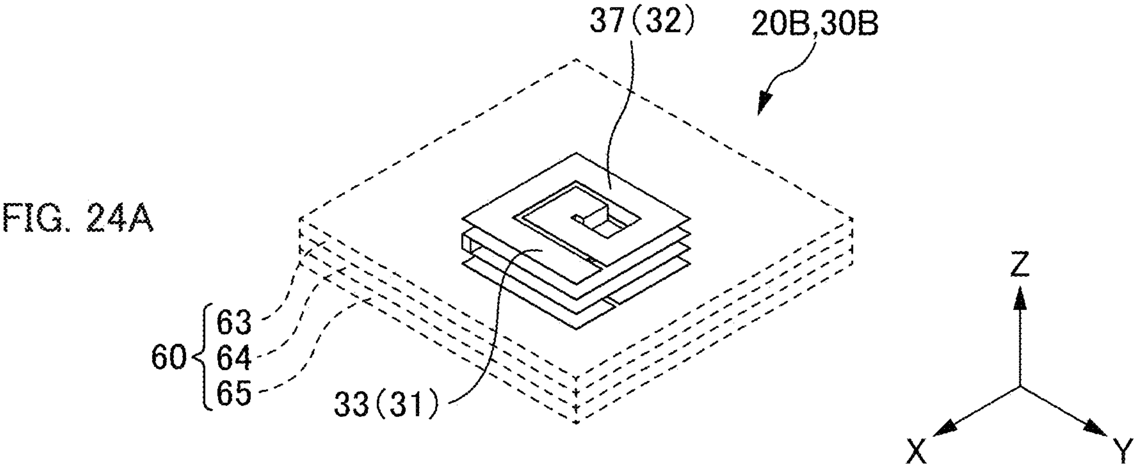
FIGS. 24A and 24B are views illustrating a second modification of arrangement of parallel resonators 20B.
Figure 24B:
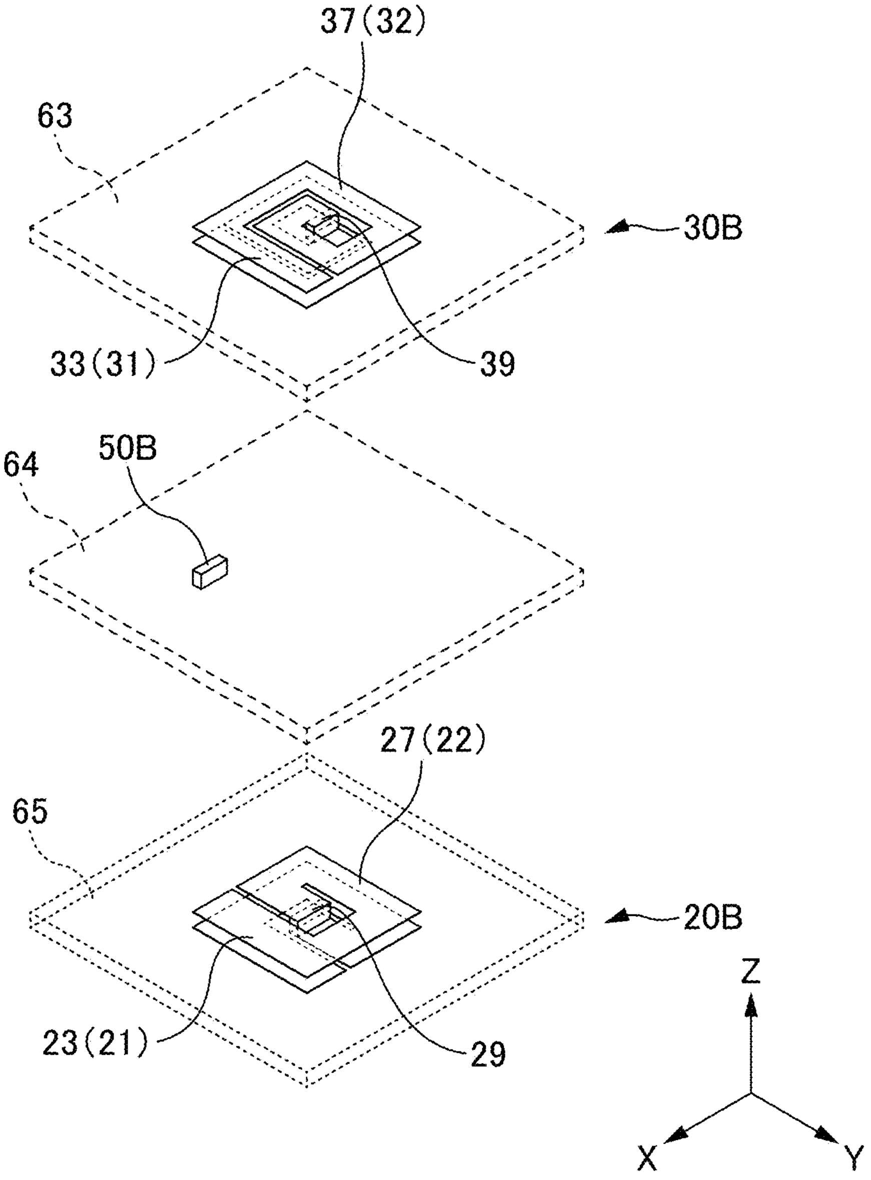
Figures 25A, 25B, 25C, 25D, 25E, 25F:
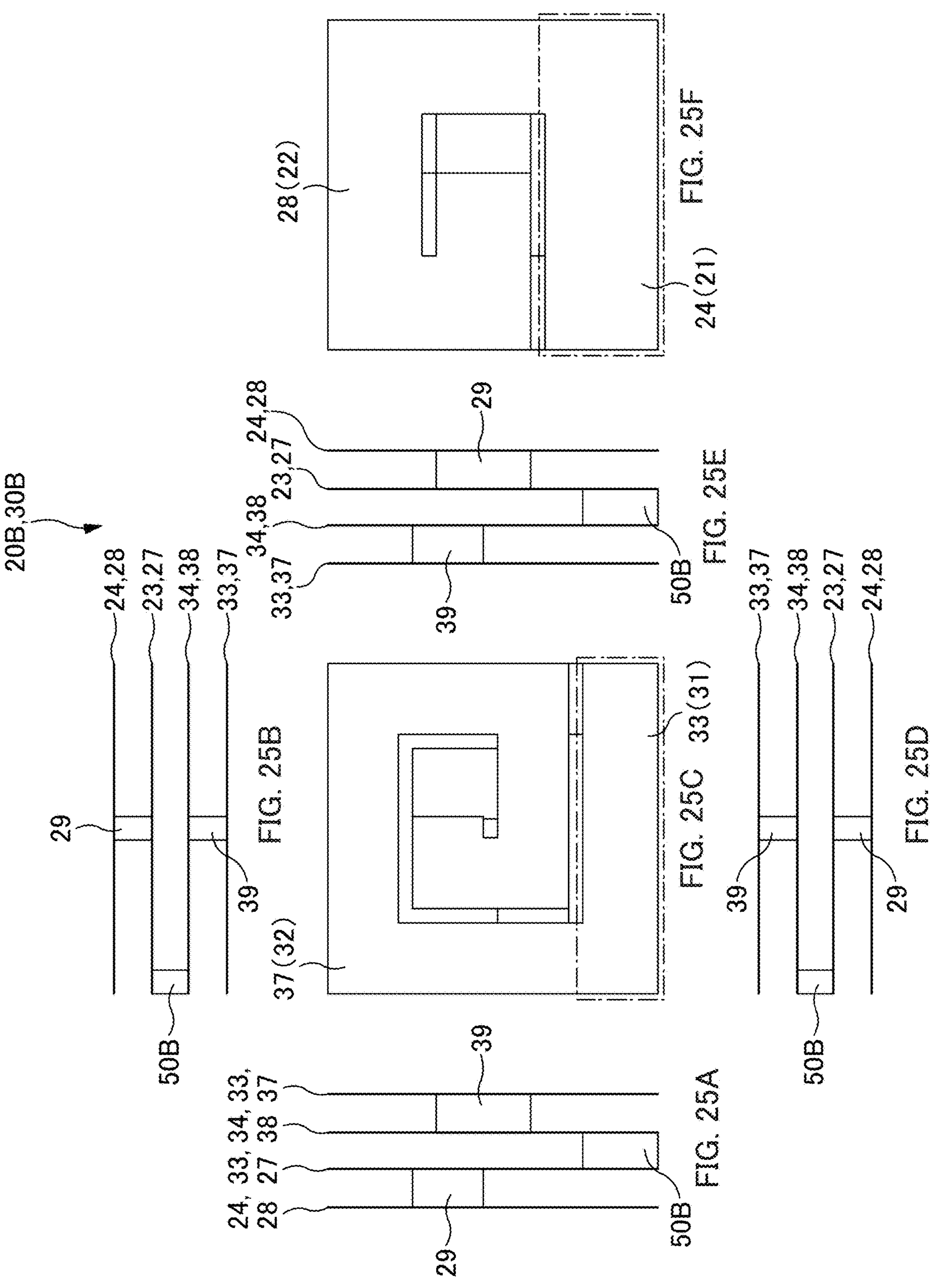
FIGS. 25A to 25F are six face views of parallel resonators 20B and 30B immediately adjacent to each other.

FIGS. 24A and 24B are views illustrating a second modification of the arrangement of the parallel resonators 20B: FIG. 24A is a perspective view of the parallel resonators 20B and 30B immediately adjacent to each other; and FIG. 24B is an exploded perspective view obtained by separating the parallel resonators 20B and 30B immediately adjacent to each other. FIGS. 25A to 25F are six face views of the parallel resonators 20B and 30B immediately adjacent to each other.

In the second modification illustrated in FIGS. 24A and 24B and 25A to 25F, the base member 60 is formed in a multi-layer structure. Specifically, the base member 60 includes three dielectric layers, which are a dielectric layer 63, a dielectric layer 64, and a dielectric layer 65. The dielectric layer 63 is located on the front surface side of the base member 60. The dielectric layer 65 is located on the back surface side of the base member 60. The dielectric layer 64 is located between the dielectric layer 63 and the dielectric layer 65 in the base member 60.

Further, as illustrated in FIG. 24B, the dielectric layer 63 is provided with the parallel resonator 30B. The dielectric layer 65 is provided with the parallel resonator 20B. In addition, the dielectric layer 64 is provided with the external connecting portion 50B configured to connect the parallel resonator 20B and the parallel resonator 30B. The parallel resonator 20B and the parallel resonator 30B are arranged to be layered in a thickness direction of the base member (the Z direction in FIGS. 24A and 24B). In other words, in the second modification, the parallel resonator 20B and the parallel resonator 30B are laminated. A base member may further include a dielectric layer 66 and a dielectric layer 67, resulting in the base member including the five dielectric layers, and may be provided with the parallel resonator 20B, the parallel resonator 30B, and the parallel resonator 40B which operate with radio waves in different frequency bands. In the plan view, the entire parallel resonator 20B and the entire parallel resonator 30B substantially overlap with each other, but the parallel resonators 20B and 30B may be, for example, shifted from each other in at least one of the X direction or the Y direction, or positioned such that part of the parallel resonator 20B overlaps with part of the parallel resonator 30B.

In the element 16B illustrated in FIG. 20, the parallel resonators 20B and 30B immediately adjacent to each other are provided in the base member 60 formed in the single layer structure. It is not limited thereto, and the immediately adjacent parallel resonators 20B and 30B may be arranged in the base member 60 formed in a multi-layer structure as well, as in the second modification illustrated in FIGS. 24A and 24B and 25A to 25F. Such an arrangement also makes it possible to suppress the influence on the characteristics of the antenna operating with the radio waves in the multiple frequency bands (herein, the L1 band and the L2 band).

<<Modifications of Connecting Path of Parallel Resonators in Element 16B>>

In FIGS. 12A to 12C described above, the modifications of the connecting path of the parallel resonators in the element 16 are described. Similarly, in the element 16B in the third embodiment as well, the connecting path of the parallel resonators in the element 16B can be modified by changing the connections each between the parallel resonators adjacent to each other (i.e., changing the positions of the external connecting portions 50B).

Figure 26A:
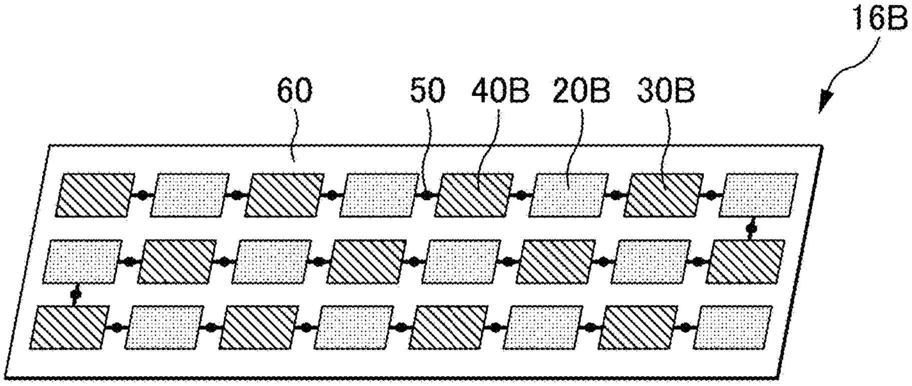
FIGS. 26A to 26C are views illustrating modifications of a connecting path of parallel resonators in an element 16B.
Figure 26B:
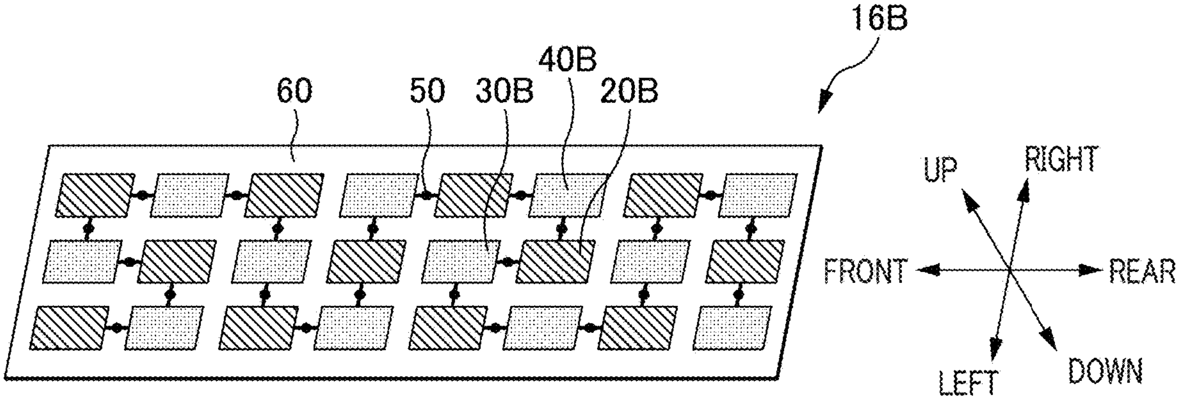
Figure 26C:
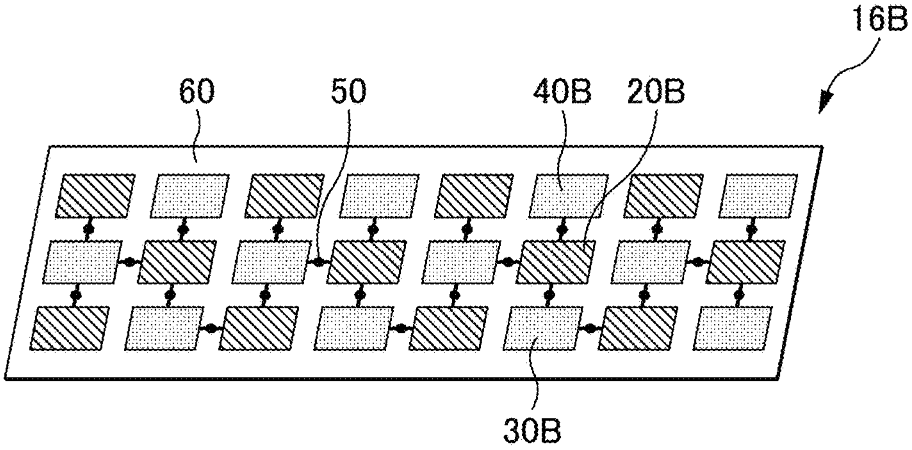

FIGS. 26A to 26C are views of modifications of the connecting path of the parallel resonators in the element 16B: FIG. 26A is an explanatory view of a first modification of the connecting path of the parallel resonators in the element 16B, FIG. 26B is an explanatory view of a second modification of the connecting path of the parallel resonators in the element 16B; and FIG. 26C is an explanatory view of a third modification of the connecting path of the parallel resonators in the element 16B.

<First Modification of Connecting Path of Parallel Resonators in Element 16B>

The connecting path of the parallel resonators in the element 16B in the first modification is a meandering path while repeatedly turning in the front-rear direction (laterally meandering path) as illustrated in FIG. 26A. Alternatively, the connecting path of the parallel resonators in the element 16B may be a path meandering while turning in the up-down direction (longitudinally meandering path). Even when the connecting path of the parallel resonators in the element 16B is configured as such, the element 16B can appropriately resonate, with the element 15, in the frequency band of radio waves for AM/FM radio. Moreover, the degree of freedom of design can be improved.

<Second Modification of Connecting Path of Parallel Resonators in Element 16B>

The connecting path of the parallel resonators in the element 16B in the second modification is a meandering path while repeatedly turning in the front-rear direction and the left-right direction irregularly as illustrated in FIG. 26B. Even when the connecting path of the parallel resonators in the element 16B is configured as such, the element 16B can appropriately resonate, with the element 15, in the frequency band of radio waves for AM/FM radio. Moreover, the degree of freedom of design can be improved.

<Third Modification of Connecting Path of Parallel Resonators in Element 16B>

In each of the first and second modifications, the connecting path of the parallel resonators in the element 16B is configured so as to pass all the illustrated parallel resonators 20B as in a single stroke. However, in the third modification, the parallel resonators 20B in two rows on the left side are connected to a connecting path that meanders while repeating turning in the left-right direction, and the parallel resonators 20B in one row on the right side are respectively connected to connecting paths branched from the aforementioned meandering connecting path. Even when the connecting path of the parallel resonators in the element 16B is configured as such, the element 16B can appropriately resonate, with the element 15, in the frequency band of radio waves for AM/FM radio. Moreover, the degree of freedom of design can be improved.

<Combination of First to Third Modifications of Connecting Path of Parallel Resonators in Element 16B>

Although each of the first to third modifications of the connecting path of the parallel resonators in the parallel resonators 20B in the element 16B is described above, the first to third modifications described above can be combined freely.

For example, the parallel resonators 20B may be divided into blocks each including multiple, such as two or four, parallel resonators, and a connecting path may be changed in each of the blocks. The connecting path may be a path that does not meander. For example, the connecting path may be configured to circulate in a spiral or extend linearly.

Fourth Embodiment

The antenna device 1B in the third embodiment is described above. In other words, the antenna 10B of the antenna device 1B in the third embodiment operates with the radio waves in two frequency bands (e.g., the L1 band and the L2 band). However, an antenna included in an antenna device may operate with radio waves in three frequency bands. Thus, the following describes an antenna device 1 in a fourth embodiment having an antenna 10C operating with radio waves in three frequency bands.

Figure 27A:
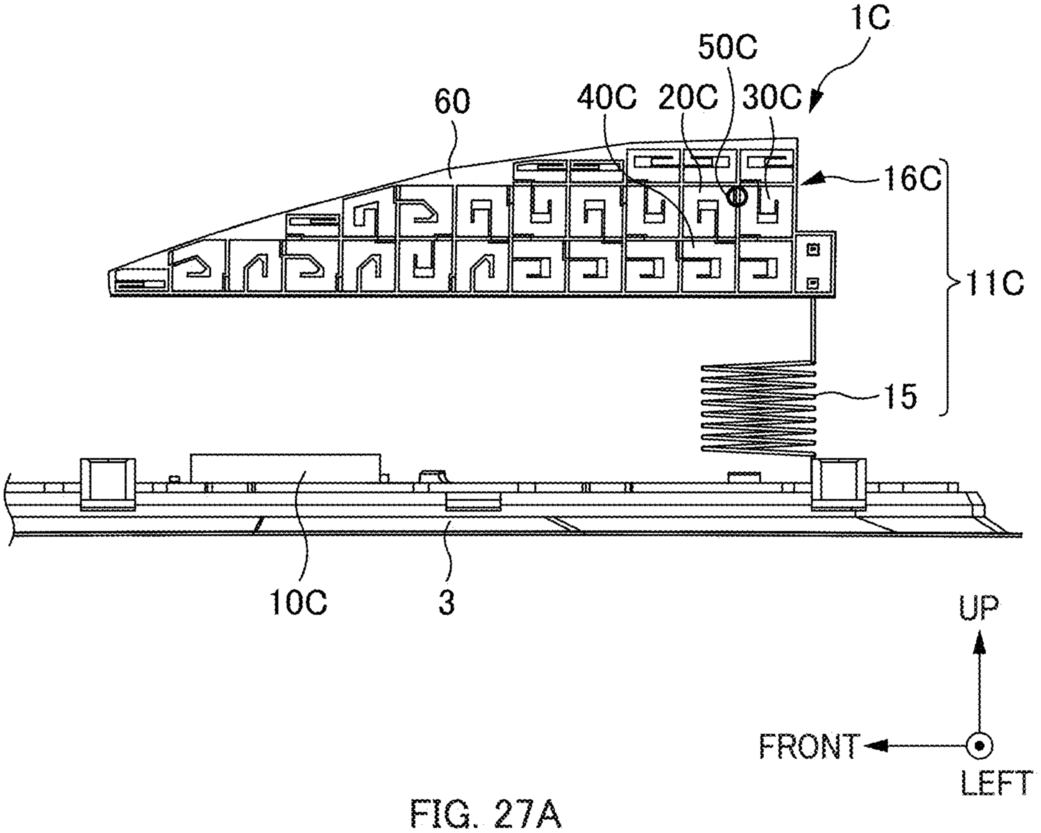
FIGS. 27A and 27B are views illustrating an antenna device 1C in a fourth embodiment.
Figure 27B:
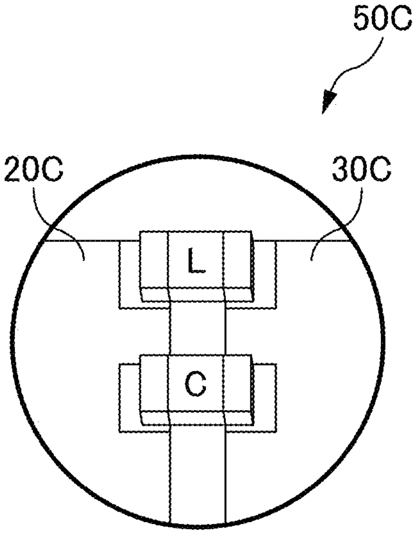

FIGS. 27A and 27B are views illustrating the antenna device 1C in the fourth embodiment: FIG. 27A is a side view of the antenna device 1C; and FIG. 27B is an enlarged view of an external connecting portion 50C.

The antenna 10B in the third embodiment can receive the radio waves in two frequency bands, which are the L1 band and the L2 band, for example. The antenna 10C in an embodiment of the present disclosure can receive radio waves in a frequency band of the L5 band, for example, in addition to the L1 band and the L2 band, although the detailed illustration is omitted. In an embodiment of the present disclosure, the antenna 10C receives radio waves in a band of 1164 MHz to 1214 MHz for the L5 band in addition to the L1 band and the L2 band. Further, a target frequency in the L5 band is the center frequency in an embodiment of the present disclosure, and the center frequency herein is 1176.45 MHz. In other words, the antenna in an embodiment of the present disclosure can receive the radio waves in the three frequency bands.

In an antenna 11C of the antenna device 1C in an embodiment of the present disclosure, an element 16C includes external connecting portions 50C which are the same as or similar to those in the second embodiment described above. In other words, the external connecting portion 50C is configured with a lumped constant circuit. The external connecting portion 50C configured with the lumped constant circuit is a parallel resonance circuit configured with a capacitor portion C and an inductor portion L as illustrated in FIG. 27C. However, the external connecting portion 50C configured with the lumped constant circuit may be configured with only an inductor portion L, or with any combination of elements capable of configuring a parallel resonance circuit.

As illustrated in FIGS. 27A and 27B, one terminal of the external connecting portion 50C is connected to a parallel resonator 20C, and the other terminal thereof is connected to a parallel resonator 30C immediately adjacent to the parallel resonator 20C. In this way, the external connecting portion 50C configured with the lumped constant circuit is provided so as to form a bridge between the immediately adjacent parallel resonators 20C and 30C.

In the antenna 11C of the antenna device 1C in an embodiment of the present disclosure, the element 16C includes parallel resonators (e.g., parallel resonators 20C) configured to resonate in a frequency band of the L1 band, for example, and parallel resonators (e.g., parallel resonators 30C and parallel resonators 40C) configured to resonate in a frequency band of the L2 band, for example, as in the antenna device 1B in the third embodiment.

In an embodiment of the present disclosure, the external connecting portions 50C resonate in another frequency band of other radio waves (e.g., the L5 band) among the multiple frequency bands of radio waves in which the antenna 10C operates. This makes it possible to suppress the influence on the characteristics of the antenna 10C operating with the radio waves in the three frequency bands (herein, the L1 band for GNSS, the L2 band, and the L5 band). Other configuration of the antenna device 1C is the same as or similar to that of the antenna device 1B in the third embodiment.

Fifth Embodiment

In the antenna devices (e.g., the antenna device 1) in the first to fourth embodiments described above, a single patch antenna (e.g., the antenna 10) is located near the AM/FM antenna (e.g., the antenna 11). However, multiple antennas may be located near the AM/FM antenna (e.g., the antenna 11). In other words, still another antenna may be included, as in an antenna device 1D in an embodiment of the present disclosure.

Figure 28:
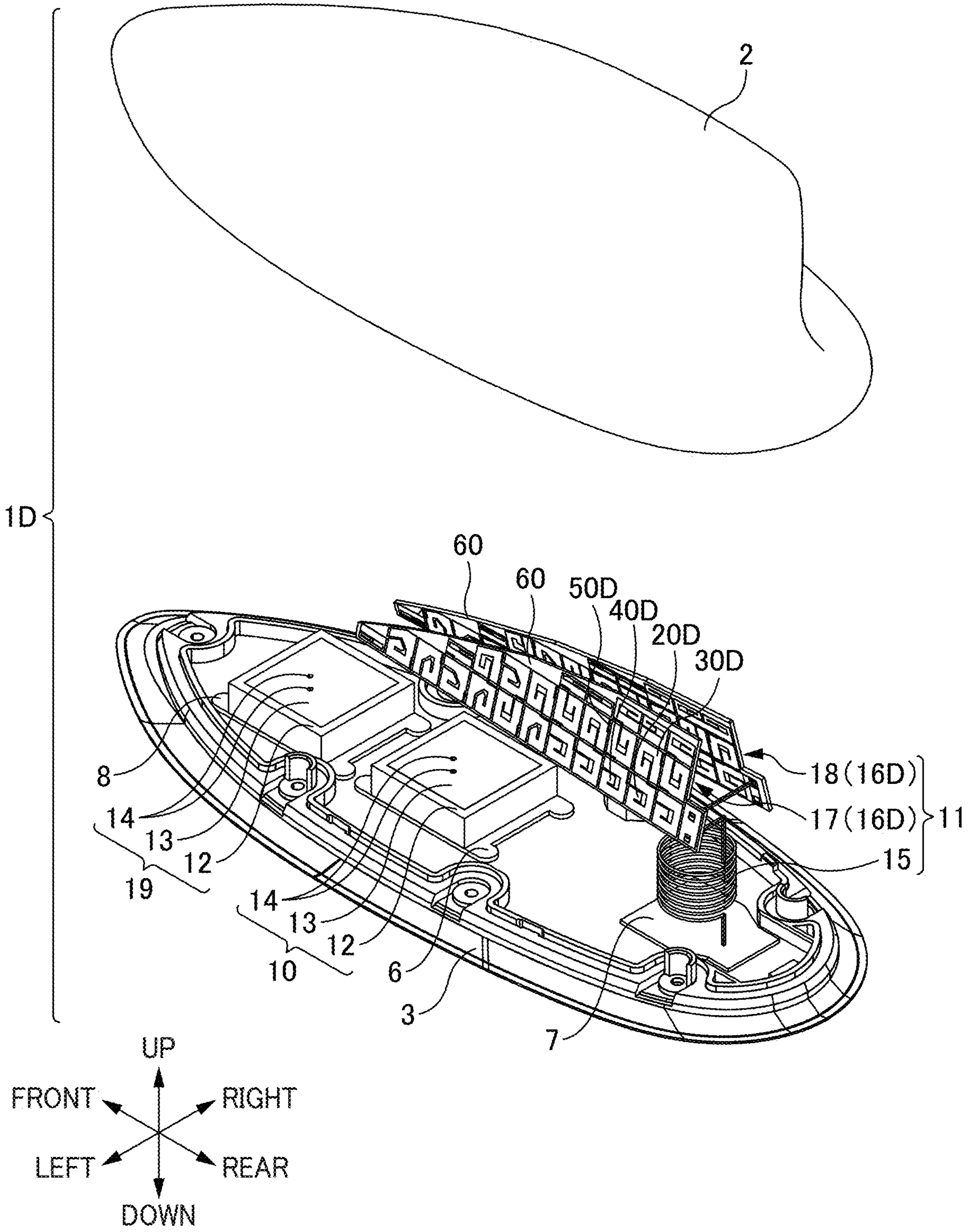
FIG. 28 is a perspective view of an antenna device 1D in a fifth embodiment.

FIG. 28 is a perspective view of the antenna device 1D in the fifth embodiment.

The antenna device 1D includes an antenna 10, an antenna 11, and an antenna 19 as illustrated in FIG. 28.

The antennas 10 and 11 of the antenna device 1D in an embodiment of the present disclosure are the same as the antennas 10 and 11 of the antenna device 1 in the first embodiment, for example. Specifically, the antenna 10 is a patch antenna operating with the radio waves in the 1.5 GHz band for GNSS and the antenna 11 is an antenna operating with the radio waves for AM/FM radio.

The antenna 19 further included in the antenna device 1D in an embodiment of the present disclosure is a patch antenna operating with radio waves in a band of 2.3 GHz for SDARS, for example. In other words, in the antenna device 1D, the frequency band of radio waves in which the antenna 10 operates is different from the frequency band of radio waves in which the antenna 19 operates. The antenna 19 is not limited to the patch antenna but may be in other antenna types, such as a monopole antenna, a dipole antenna, a collinear antenna, and a bowtie antenna, or may be an antenna operating in any of various frequency bands, such as a telematics antenna, a V2X antenna, a Wi-Fi antenna, a Blue-tooth antenna, a keyless antenna, and a smart key antenna.

In the antenna device 1D in an embodiment of the present disclosure, an element 16D is the same as or similar to the element 16A in the second embodiment illustrated in FIGS. 19A to 19C, for example. In other words, multiple parallel resonators 20D in the element 16D resonate in the frequency band (e.g., the 1.5 GHz band for GNSS) of radio waves in which the antenna 10 operates. Meanwhile, the external connecting portions 50D in the element 16D are each configured with a lumped constant circuit, and resonate in the frequency band (e.g., the band of 2.3 GHz for SDARS) of radio waves in which the antenna 19 operates. This makes it possible to suppress the influence on the characteristics of the multiple antennas (the antennas 10 and 19).

However, in the antenna device 1D in an embodiment of the present disclosure, the element 16D may be the same as or similar to the element 16B in the third embodiment illustrated in FIG. 20, for example. In other words, the element 16D may include parallel resonators configured to resonate in the frequency band of radio waves in which the antenna 10 operates (e.g., parallel resonators 20D), and parallel resonators configured to resonate in the frequency band of radio waves in which the antenna 19 operates (e.g., parallel resonators 30D and parallel resonators 40D). This makes it possible to suppress the influence on the characteristics of the multiple antennas (the antennas 10 and 19).

Summary

The antennas 11 and 11A in embodiments of the present disclosure are described hereinabove. For example, as illustrated in FIGS. 2, 4, and 5A and 5B, the antenna 11 comprises: the element 16 including the plurality of the parallel resonators 20, 30, 40 configured to resonate in the 1.5 GHz band for GNSS (the L1 band); and at least one of the external connecting portions 50 configured to connect the parallel resonators immediately adjacent to each other (the parallel resonators 20, 30 or the parallel resonators 20, 40) in the plurality of the parallel resonators 20, 30, 40; and the element 15 configured to be connected to the element 16. The element 16 and the element 15 operate with radio waves, for example, in the frequency band for AM/FM radio (522 kHz to 1710 kHz for AM broadcast and 76 MHz to 108 MHz for FM broadcast) different from the 1.5 GHz band for GNSS. The antenna 11 as such makes it possible to suppress the influence on the characteristics of another antenna (the antenna 10).

Here, the 1.5 GHz band for GNSS (the L1 band) corresponds to a "first frequency band" and the frequency band for AM/FM radio corresponds to a "second frequency band". Further, the external connecting portion 50 corresponds to a "first connecting portion". The element 16 corresponds to a "first element", and the element 15 corresponds to a "second element".

In the antenna 11, for example, as illustrated in FIGS. 2, 4, and 5A and 5B, the element 16 includes the base member and the plurality of the parallel resonators 20, 30, 40 are provided to the base member 60. This makes it possible to easily configure the element 16 of the antenna 11 that suppresses the influence on the characteristics of another antenna (the antenna 10).

In the antenna 11, for example, as illustrated in FIG. 6A, the maximum dimension of the parallel resonator 20 is equal to or smaller than one tenth of the wavelength of the 1.5 GHz band for GNSS (the L1 band), for example. This makes it possible to suppress the influence on the characteristics of another antenna (the antenna 10).

Moreover, in the antenna 11, for example, as illustrated in FIG. 6B, the length of the at least one of the external connecting portions 50 is equal to or smaller than one tenth of the wavelength of the 1.5 GHz band for GNSS (the L1 band), for example. This makes it possible to suppress the influence on the characteristics of another antenna (the antenna 10).

In the antenna 11, as illustrated in FIGS. 7A to 7F, 14A to 14F, 16A to 16F, and 18A to 18F, in the plan view of the parallel resonator 20, the outer shape of the parallel resonator 20 is any one of shapes including a quadrangular shape, a polygonal shape, a circular shape, an elliptical shape, a semi-circular shape, and a semi-elliptical shape, or is a combination of any two or more of the shapes. Thus, the element 16 of the antenna (the antenna 11) that suppresses the influence on the characteristics of another antenna (the antenna 10) can be configured with the parallel resonators 20 in the various shapes. Accordingly, the degree of freedom of design can be improved.

In the antenna 11, for example, as illustrated in FIGS. 3A, 3B, 6A, 6B, and 7A to 7F, the parallel resonator 20 includes the capacitor 21 including the pair of the conductors 23 and 24 opposed to each other, and the inductor 22 configured to be connected in parallel to the capacitor 21. This enables the parallel resonator 20 to resonate in the 1.5 GHz band for GNSS (the L1 band), for example.

In the antenna 11, for example, as illustrated in FIGS. 3A, 3B, 6A, 6B, and 7A to 7F, the inductor 22 includes the internal connecting portion 29 configured to connect the conductor 23 on one side and the conductor 24 on the other side of the pair of the conductors 23 and 24, and, in the plan view of the parallel resonator 20, the internal connecting portion 29 is located closer to the center of the outer shape of the parallel resonator 20 than to the outer edge of the outer shape thereof. This makes it possible to reduce the maximum dimension of the parallel resonator 20.

In the antenna 11, for example, as illustrated in FIGS. 3A, 3B, 6A, 6B, and 7A to 7F, the element 16 includes the base member 60, and the parallel resonator 20 includes: the conductors 23 and 24 configured to operate as the capacitor 21; the arm 27 extending from the conductor 23 and the arm 28 extending from the conductor 24, the arms 27 and 28 being configured to operate as the inductor 22, and the internal connecting portion 29 configured to connect the arm 27 and the arm 28. The conductor 23 and the arm 27 are located in the front surface 61 of the base member 60, and the conductor 24 and the arm 28 are located in the back surface 62 of the base member 60, the back surface 62 being opposed to the front surface 61. This makes it possible to easily configure the element 16 of the antenna 11 that suppresses the influence on the characteristics of another antenna (the antenna 10).

Here, the conductor 23 corresponds to a "first conductor" and the conductor 24 corresponds to a "second conductor". The arm 27 corresponds to a "first arm" and the arm 28 corresponds to a "second arm". The front surface 61 corresponds to a "first surface" and the back surface 62 corresponds to a "second surface".

In the antenna 11, as illustrated in FIGS. 7A to 7F for example, in the plan view of the parallel resonator 20, the arm 28 is located closer to the center of the outer shape of the parallel resonator 20 than to the outer edge of the outer shape thereof. This makes it possible to reduce the maximum dimension of the parallel resonator 20.

In the antenna 11, for example, as illustrated in FIGS. 6A, 6B, and 7A to 7F, the plurality of the parallel resonators include the parallel resonator 30, the parallel resonator 20, and the parallel resonator 40. The parallel resonators 30 and 20 are arranged immediately adjacent to each other and the parallel resonators 20 and 40 are arranged immediately adjacent to each other. The parallel resonator 20 includes the connecting region 25 in which the parallel resonator 20 is connected to the parallel resonator 30 and the connecting region 26 in which the parallel resonator 20 is connected to the parallel resonator 40. The connecting region 25 is located in the front surface 61 of the base member 60, and the connecting region 26 is located in the back surface 62 of the base member 60. This makes it possible to easily configure the element 16 of the antenna 11 that suppresses the influence on the characteristics of another antenna (the antenna 10). This also makes it possible to flexibly set the position of the parallel resonator 30 (or the parallel resonator 40) immediately adjacent to the parallel resonator 20, thereby being able to improve the degree of freedom in design.

Here, the parallel resonator 30 corresponds to a "first parallel resonator", the parallel resonator 20 corresponds to a "second parallel resonator", and the parallel resonator 40 corresponds to a "third parallel resonator". The connecting region 25 corresponds to a "first connecting region" and the connecting region 26 corresponds to a "second connecting region".

In the antenna 11, for example, as illustrated in FIGS. 6A, 6B, and 7A to 7F, the connecting region 26 is located in a region other than the region opposed to the connecting region 25, in the back surface 62. This makes it possible to easily configure the element 16 of the antenna 11 that suppresses the influence on the characteristics of another antenna (the antenna 10). This also makes it possible to flexibly set the position of the parallel resonator 30 (or the parallel resonator 40) immediately adjacent to the parallel resonator thereby being able to improve the degree of freedom in design.

In the antenna 11, as illustrated in FIGS. 7A to 7F for example, in the plan view of the parallel resonator 20, the connecting region 26 is located in the region, in the back surface 62, that is line symmetric to the region opposed to the connecting region 25 with respect to the straight line passing through the center of the outer shape of the parallel resonator 20, or point symmetric thereto with respect to the center of the outer shape of the parallel resonator 20. This makes it possible to easily configure the element 16 of the antenna 11 that suppresses the influence on the characteristics of another antenna (the antenna 10). This also makes it possible to flexibly set the position of the parallel resonator (or the parallel resonator 40) immediately adjacent to the parallel resonator 20, thereby being able to improve the degree of freedom in design.

In the antenna 11, for example, as illustrated in FIG. 6B, at least one of the parallel resonator 30 or the parallel resonator 40 is connected to at least one of the connecting region 25 or the connecting region 26. This makes it possible to easily configure the element 16 of the antenna 11 that suppresses the influence on the characteristics of another antenna (the antenna 10). This also makes it possible to flexibly set the position of the parallel resonator 30 (or the parallel resonator 40) immediately adjacent to the parallel resonator 20, thereby being able to improve the degree of freedom in design.

Here, at least one of the parallel resonator 30 or the parallel resonator 40 corresponds to "another parallel resonator".

In the antenna 11, for example, as illustrated in FIGS. 2, 4, and 5A and 5B, the parallel resonator is the distributed constant circuit. This makes it possible to easily configure the element 16 of the antenna 11 that suppresses the influence on the characteristics of another antenna (the antenna 10).

In the antenna 11, for example, as illustrated in FIGS. 2 and 12A to 12C, the connecting path of the plurality of the parallel resonators 20, 30, 40 that are connected using the external connecting portions 50 meanders. This makes it possible to easily configure the element 16 of the antenna 11 that suppresses the influence on the characteristics of another antenna (the antenna 10). Moreover, the degree of freedom of design can be improved.

Further, in the antenna 11A, for example, as illustrated in FIGS. 19A to 19C, the external connecting portion 50A is the lumped constant circuit and resonates in the 1.5 GHz band for GNSS (the L1 band) and, for example, the L2 band different from the frequency band for AM/FM radio. This makes it possible to suppress the influence on the characteristics of another antenna (the antenna 10A) operating with the radio waves in multiple frequency bands.

Here, the L2 band corresponds to a "third frequency band".

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

REFERENCE SIGNS LIST

1, 1A to 1D, 1X antenna device
2 case
3 base
4 insulating base
5 metal base
6, 7, 8 substrate
10A antenna (GNSS antenna, patch antenna)
11, 11A, 11B, 11X antenna (AM/FM antenna)
12 dielectric member
13, 13A radiating element
14 feeding section
15 element
16, 16B, 16X element
17, 18 assembly
19 antenna
20, 20B parallel resonator
21 capacitor
22 inductor
23, 24 conductor
26 connecting region
27, 28 arm
29 internal connecting portion
30B parallel resonator
31 capacitor
32 inductor
33, 34 conductor
36 connecting region
37, 38 arm
39 internal connecting portion
40B parallel resonator
50, 50A to 50C external connecting portion
60 base member
61 front surface
62 back surface
63 to 65 dielectric layer
70 slot
100 vehicle
101 roof

The invention claimed is:

1. An antenna comprising:
a first element including
a plurality of parallel resonators configured to resonate in a first frequency band, and
at least one first connecting portion configured to connect the parallel resonators immediately adjacent to each other in the plurality of the parallel resonators; and
a second element configured to be connected to the first element, wherein
the first element and the second element operate with radio waves in a second frequency band different from the first frequency band,
the at least one first connecting portion includes first connecting portions, and
a connecting path of the plurality of the parallel resonators that are connected by the first connecting portions meanders.

2. The antenna according to claim 1, wherein
the first element includes a base member, and
the plurality of the parallel resonators are provided to the base member.

3. The antenna according to claim 1, wherein
a maximum dimension of each of the plurality of the parallel resonators is equal to or smaller than one tenth of a wavelength of the first frequency band.

4. The antenna according to claim 1, wherein
a length of the least one first connecting portion is equal to or smaller than one tenth of a wavelength of the first frequency band.

5. The antenna according to claim 1, wherein
in a plan view of each of the plurality of the parallel resonators, an outer shape of the parallel resonator is any one of shapes including a quadrangular shape, a polygonal shape, a circular shape, an elliptical shape, a semi-circular shape, and a semi-elliptical shape, or is a combination of any two or more of the shapes.

6. The antenna according to claim 1, wherein
each of the plurality of the parallel resonators includes,
a capacitor including a pair of conductors opposed to each other, and
an inductor configured to be connected in parallel to the capacitor.

7. The antenna according to claim 6, wherein
the inductor includes a second connecting portion configured to connect one of the pair of the conductors to another of the pair of the conductors, and
in a plan view of each of the plurality of the parallel resonators, the second connecting portion is located closer to a center of an outer shape of the parallel resonator than to an outer edge of the outer shape of the parallel resonator.

8. The antenna according to claim 1, wherein
the first element includes a base member,
each of the plurality of the parallel resonators includes
a first conductor and a second conductor, the first and second conductors being configured to operate as a capacitor,
a first arm extending from the first conductor and a second arm extending from the second conductor, the first and second arms being configured to operate as an inductor, and
a second connecting portion configured to connect the first arm and the second arm,
the first conductor and the first arm are located in a first surface of the base member, and
the second conductor and the second arm are located in a second surface of the base member, the second surface being opposed to the first surface.

9. The antenna according to claim 8, wherein
in a plan view of each of the plurality of the parallel resonators, the second connecting portion is located closer to a center of an outer shape of the parallel resonator than to an outer edge of the outer shape of the parallel resonator.

10. The antenna according to claim 1, wherein
each of the plurality of the parallel resonators is a distributed constant circuit.

11. An antenna comprising:
a first element including
a plurality of parallel resonators configured to resonate in a first frequency band, and
at least one first connecting portion configured to connect the parallel resonators immediately adjacent to each other in the plurality of the parallel resonators; and a second element configured to be connected to the first element, wherein the first element and the second element operate with radio waves in a second frequency band different from the first frequency band, the first element includes a base member, each of the plurality of the parallel resonators includes a first conductor and a second conductor, the first and second conductors being configured to operate as a capacitor, a first arm extending from the first conductor and a second arm extending from the second conductor, the first and second arms being configured to operate as an inductor, and a second connecting portion configured to connect the first arm and the second arm, the first conductor and the first arm are located in a first surface of the base member, and the second conductor and the second arm are located in a second surface of the base member, the second surface being opposed to the first surface, the plurality of the parallel resonators include a first parallel resonator, a second parallel resonator, and a third parallel resonator, the first parallel resonator and the second parallel resonator are arranged immediately adjacent to each other and the second parallel resonator and the third parallel resonator are arranged immediately adjacent to each other, the second parallel resonator includes a first connecting region in which the second parallel resonator is connected to the first parallel resonator, and a second connecting region in which the second parallel resonator is connected to the third parallel resonator, the first connecting region is located in the first surface of the base member, and the second connecting region is located in the second surface of the base member.

12. The antenna according to claim 11, wherein the second connecting region is located in a region other than a region opposed to the first connecting region, in the second surface.

13. The antenna according to claim 12, wherein in a plan view of each of the plurality of the parallel resonators, the second connecting region is located in a region, in the second surface, that is line symmetric to the region opposed to the first connecting region, with respect to a straight line passing through a center of an outer shape of the parallel resonator, or point symmetric thereto with respect to the center of the outer shape of the parallel resonator.

14. The antenna according to claim 11, wherein another parallel resonator in the plurality of the parallel resonators is connected to at least one of the first connecting region or the second connecting region.

15. An antenna comprising:

a first element including a plurality of parallel resonators configured to resonate in a first frequency band, and at least one first connecting portion configured to connect the parallel resonators immediately adjacent to each other in the plurality of the parallel resonators; and a second element configured to be connected to the first element, wherein the first element and the second element operate with radio waves in a second frequency band different from the first frequency band, each of the first connecting portions is a lumped constant circuit, and the lumped constant circuit resonates in a third frequency band different from the first frequency band and the second frequency band, wherein each of the plurality of the parallel resonators includes, a capacitor including a pair of conductors opposed to each other, and an inductor configured to be connected in parallel to the capacitor.

16. The antenna according to claim 15, wherein the first element includes a base member, and the plurality of the parallel resonators are provided to the base member.

17. The antenna according to claim 15, wherein a maximum dimension of each of the plurality of the parallel resonators or a length of the at least one first connecting portion is equal to or smaller than one tenth of a wavelength of the first frequency band.

18. The antenna according to claim 15, wherein the inductor includes a second connecting portion configured to connect one of the pair of the conductors to another of the pair of the conductors, and in a plan view of each of the plurality of the parallel resonators, the second connecting portion is located closer to a center of an outer shape of the parallel resonator than to an outer edge of the outer shape of the parallel resonator.

19. The antenna according to claim 15, wherein the first element includes a base member, each of the plurality of the parallel resonators includes a first conductor and a second conductor, the first and second conductors being configured to operate as a capacitor, a first arm extending from the first conductor and a second arm extending from the second conductor, the first and second arms being configured to operate as an inductor, and a second connecting portion configured to connect the first arm and the second arm, the first conductor and the first arm are located in a first surface of the base member, and the second conductor and the second arm are located in a second surface of the base member, the second surface being opposed to the first surface.

* * * * *